US011070966B2

United States Patent
Buckley et al.

(10) Patent No.: US 11,070,966 B2
(45) Date of Patent: Jul. 20, 2021

(54) PUBLIC WARNING SYSTEM NOTIFICATIONS IN A MOBILE DEVICE USING ALTERNATIVE WIRELESS TECHNOLOGIES

(71) Applicant: BlackBerry Limited, Waterloo (CA)

(72) Inventors: Adrian Buckley, Tracy, CA (US); Gordon Peter Young, Kineton (GB); Michael Peter Montemurro, Toronto (CA); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/001,663

(22) Filed: Jun. 6, 2018

(65) Prior Publication Data

US 2019/0380019 A1 Dec. 12, 2019

(51) Int. Cl.
| | |
|---|---|
| H04W 4/90 | (2018.01) |
| H04W 76/16 | (2018.01) |
| H04L 5/00 | (2006.01) |
| H04W 4/20 | (2018.01) |
| H04W 76/50 | (2018.01) |
| H04M 1/725 | (2021.01) |
| H04M 1/72418 | (2021.01) |
| H04H 20/59 | (2008.01) |

(52) U.S. Cl.
CPC ............ *H04W 4/90* (2018.02); *H04L 5/0094* (2013.01); *H04M 1/72418* (2021.01); *H04W 4/20* (2013.01); *H04W 76/16* (2018.02); *H04W 76/50* (2018.02); *H04H 20/59* (2013.01); *H04M 2242/04* (2013.01)

(58) Field of Classification Search
CPC ......... H04W 4/90; H04W 4/06; H04W 76/50; H04W 48/18; H04W 4/029; H04W 4/02; H04W 88/06; H04H 20/59; G08B 25/016; H04M 2242/04; H04M 2242/30; H04M 3/42348; H04M 1/72536; H04M 3/5116; G01S 19/17; H04L 51/20
See application file for complete search history.

(56) References Cited

U.S. PATENT DOCUMENTS

| 7,039,386 B2 * | 5/2006 | Kolsrud | H04L 12/1895 455/404.1 |
|---|---|---|---|
| 8,571,501 B2 | 10/2013 | Miller et al. | |
| 9,753,116 B2 * | 9/2017 | Ejima | G01S 5/02 |
| 9,961,524 B2 * | 5/2018 | Suh | H04W 4/90 |

(Continued)

OTHER PUBLICATIONS

3GPP TS 22.268 V14.1.0; 3rd Generation Partnership Project; Technical Specification Group Services and System Aspects; Public Warning System (PWS) Requirements; Release 14; Jun. 2017; 16 pages.

(Continued)

*Primary Examiner* — Nam T Huynh
(74) *Attorney, Agent, or Firm* — Conley Rose, P.C.; J. Robert Brown, Jr.

(57) ABSTRACT

A method at a user equipment, the method including receiving at the user equipment over a first technology, an emergency notification, the emergency notification providing information for a second technology capable of carrying an emergency message; and activating the second technology using the information for the second technology to receive the emergency message.

17 Claims, 11 Drawing Sheets

(56) References Cited

U.S. PATENT DOCUMENTS

| | | | |
|---|---|---|---|
| 2006/0184962 A1* | 8/2006 | Kendall | G08B 27/008 725/33 |
| 2007/0037549 A1 | 2/2007 | Poltorak | |
| 2009/0264149 A1* | 10/2009 | Miller | H04H 60/13 455/552.1 |
| 2010/0105351 A1 | 4/2010 | Xu et al. | |
| 2011/0280231 A1 | 11/2011 | Montemurro et al. | |
| 2013/0281045 A1* | 10/2013 | Daly | H04W 4/90 455/404.1 |
| 2015/0256276 A1 | 9/2015 | Jones | |
| 2017/0164174 A9 | 6/2017 | Daly et al. | |
| 2017/0171814 A1* | 6/2017 | Belghoul | H04W 52/0212 |

OTHER PUBLICATIONS

3GPP TS 23.003 V15.3.0; 3rd Generation Partnership Project; Technical Specification Group Core Network and Terminals; Numbering, Addressing and Identification; Release 15; Mar. 2018; 118 pages.

3GPP TS 23.040 V15.0.0; 3rd Generation Partnership Project; Technical Specification Group Core Network and Terminals; Technical Realization of the Short Message Service (SMS); Release 15; Mar. 2018; 216 pages.

3GPP TS 23.041 V15.1.0; 3rd Generation Partnership Project; Technical Specification Group Core Network and Terminals; Technical Realization of Cell Broadcast Service (CBS); Release 15; Mar. 2018; 92 pages.

3GPP TS 24.302 V15.2.0; 3rd Generation Partnership Project; Technical Specification Group Core Network and Terminals; Access to the 3GPP Evolved Packet Core (EPC) via Non-3GPP Access Networks; Stage 3; Release 15; Mar. 2018; 173 pages.

3GPP TS 27.007 V15.1.0; 3rd Generation Partnership Project; Technical Specification Group Core Network and Terminals; AT Command Set for User Equipment (UE); Release 15; Mar. 2018; 359 pages.

3GPP TS 36.300 V15.1.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 15; Mar. 2018; 341 pages.

3GPP TS 36.304 V14.6.0; 3rd Generation Partnership Project; Technical Specification Group Radio Access Network; Evolved Universal Terrestrial Radio Access (E-UTRA); User Equipment (UE) Procedures in Idle Mode; Release 14; Mar. 2018; 50 pages.

3GPP TS 36.331 V15.1.0; 3rd Generation Partnership Project; Technical Specification Group Radio Access Network; Evolved Universal Terrestrial Radio Access (E-UTRA); Radio Resource Control (RRC) Protocol Specification; Release 15; Mar. 2018; 786 pages.

ETSI TS 102 900 V1.1.1; Emergency Communication (EMTEL); European Public Warning System (EU-ALERT) using the Cell Broadcast Service; Oct. 2010; 17 pages.

European Committe for Electrotechnical Standardization; "Specification of the Radio Data System (RDS) for VHF/FM Sound Broadcasting in the Frequency Range from 87,5 to 108,0 MHz"; EN 50067; Apr. 1998; 132 pages.

IEEE Computer Society; "IEEE Standard for Information Technology—Telecommunications and Information Exchange Between Systems—Local and Metropolitan Area Networks—Specification Requirements, Part 11: Wireless—LAN Medium Access Control (MAC) and Physical Layer (PHY) Specifications, Amendment 6: Wireless Access in Vehicular Environments"; IEEE Std 802.11p-2010; Jul. 15, 2010; 51 pages.

IEEE Computer Society; "IEEE Standard for Information Technology—Telecommunications and Information Exchange Between Systems Local and Metropolitan Area Networks—Specification Requirements, Part 11: Wireless—LAN Medium Access Control (MAC) and Physical Layer (PHY) Specifications"; IEEE Std 802.11-2016; Dec. 14, 2016; 3534 pages.

National Radio Systems Committee; "NRSC-4-B United States RBDS Standard Specification of the Radio Broadcast Data System (RBDS)"; Apr. 2011; 36 pages.

Oasis; "Common Alerting Protocol Version 1.2"; Jul. 1, 2010; 47 pages.

Wi-Fi Alliance; "Wi-Fi Simple Configuration Technical Specification Version 2.0.6"; Apr. 26, 2018; 155 pages.

Aboba, B., et al.; "Extensible Authentication Protocol (EAP)"; RFC 3748; Jun. 2004; 67 pages.

Haverinen, H., et al.; "Extensible Authentication Protocol Method for Global System for Mobile Communications (GSM) Subscriber Identity Modules (EAP-SIM)"; RFC 4186; Jan. 2006; 92 pages.

Arkko, J., et al.; "Extensible Authentication Protocol Method for 3rd Generation Authentication and Key Agreement (EAP-AKA)"; RFC 4187; Jan. 2006; 79 pages.

Arkko, J., et al.; "Improved Extensible Authentication Protocol Method for 3rd Generation Authentication and Key Agreement (EAP-AKA)"; RFC 5448; May 2009; 29 pages.

Prabhakar, Sharath Kattemane; "EAP SIM and EAP-AKA"; https://community.cisco.com/t5/wireless-mobility-documents/eap-sim-and-eap-aka/ta-p/3143656; Feb. 12, 2014; 4 pages.

Petel, Efraim; "Gone to Mexico—for Earthquake Training"; The AtHoc Exchange; https://blog.athoc.com/athoc-blog/9-gone-to-mexico-for-earthquake-training.html; Mar. 27, 2014; 1 page.

Denton, Paul; "What is RDS All About?"; http://www.pauldenton.co.uk/RDSradiodatasystem.htm; Nov. 28, 2017; 2 pages.

Techopedia; "Radio Broadcast Data System (RBDS)"; https://www.techopedia.com/definition/9103/radio-broadcast-data-system-rbds; Apr. 4, 2018; 1 pages.

Wikipedia; "Emergency Alert System"; Aug. 20, 2018; 14 pages.

Wikipedia; "FM Broadcasting"; Aug. 20, 2018; 15 pages.

Kastrenakes, Jacob; "FCC Asks Apple to Activate the iPhone's Hidden FM Radio to Aid Public Safety"; https://www.theverge.com/2017/9/28/16379316/fcc-iphone-fm-radio-activation-request-ajit-pai; Sep. 28, 2017; 3 pages.

Marantz; "RDS and How Can It Increase Enjoyment of FM Radio"; https://marantz.custhelp.com/app/answers/detail/a_id/174/~/rds-and-how-can-it-increase-enjoyment-of-fm-radio; Aug. 16, 2007; 4 pages.

Petel, Efraim; "Mexico Knows if There's an Earthquake Coming, Why Doesn't the U.S.?"; The AtHoc Exchange; https://blog.athoc.com/athoc-blog/2-mexico-knows-if-theres-an-earthquake-coming-why-doesnt-the-us.html; Apr. 22, 2014; 1 page.

Alliance for Telecommunications Industry Solutions; "CMAS via EPS Public Warning System Specification"; ATIS Standard 0700010; Aug. 1, 2010; 37 pages.

PCT International Search Report; Application No. PCT/EP2019/058574; dated Jun. 4, 2019; 4 pages.

PCT Written Opinion of the International Searching Authority; Application No. PCT/EP2019/058574; dated Jun. 4, 2019; 10 pages.

* cited by examiner

US 11,070,966 B2

1

PUBLIC WARNING SYSTEM NOTIFICATIONS IN A MOBILE DEVICE USING ALTERNATIVE WIRELESS TECHNOLOGIES

FIELD OF THE DISCLOSURE

The present disclosure relates to public warning systems, and in particular relates to public warning systems utilizing mobile devices.

BACKGROUND

A public warning system is a system that may be used to provide timely and accurate alerts, warnings and critical information regarding disasters and other emergencies. For example, such system may be utilized for severe weather warnings, flood warnings, wildfire warnings, hazardous material release warnings, terrorist threats, water contamination warnings, amber alerts, among other threats to life, property or safety.

The public warning system may be provided through cellular connected devices. For example, the public warning system (PWS) is currently defined in the Third Generation Partnership Project (3GPP) and provides a framework for regional emergency services. However, the use of a public warning system through cellular has limitations. In particular, wireless local area networks provide very limited coverage and cellular coverage is not ubiquitous. Further cellular operatives have little incentive to deploy PWS service as they generate little or zero revenue and deployment requires resources at every cell site.

Further, wireless local area network information received by an Access Network Query Protocol (ANQP) when not associated with the network is not secure, and hence public warning system information may not be trusted from a WLAN. Therefore, during an emergency, reliance on the cellular PWS system to provide all alerts and safety back up information may be insufficient, and may further be detrimental to the ongoing performance of the cellular device.

BRIEF DESCRIPTION OF THE DRAWINGS

The present disclosure will be better understood with reference to the drawings, in which:

FIG. 7 is process diagram for selecting a station or frequency to tune a second technology to;

DETAILED DESCRIPTION OF THE DRAWINGS

Figure 1:
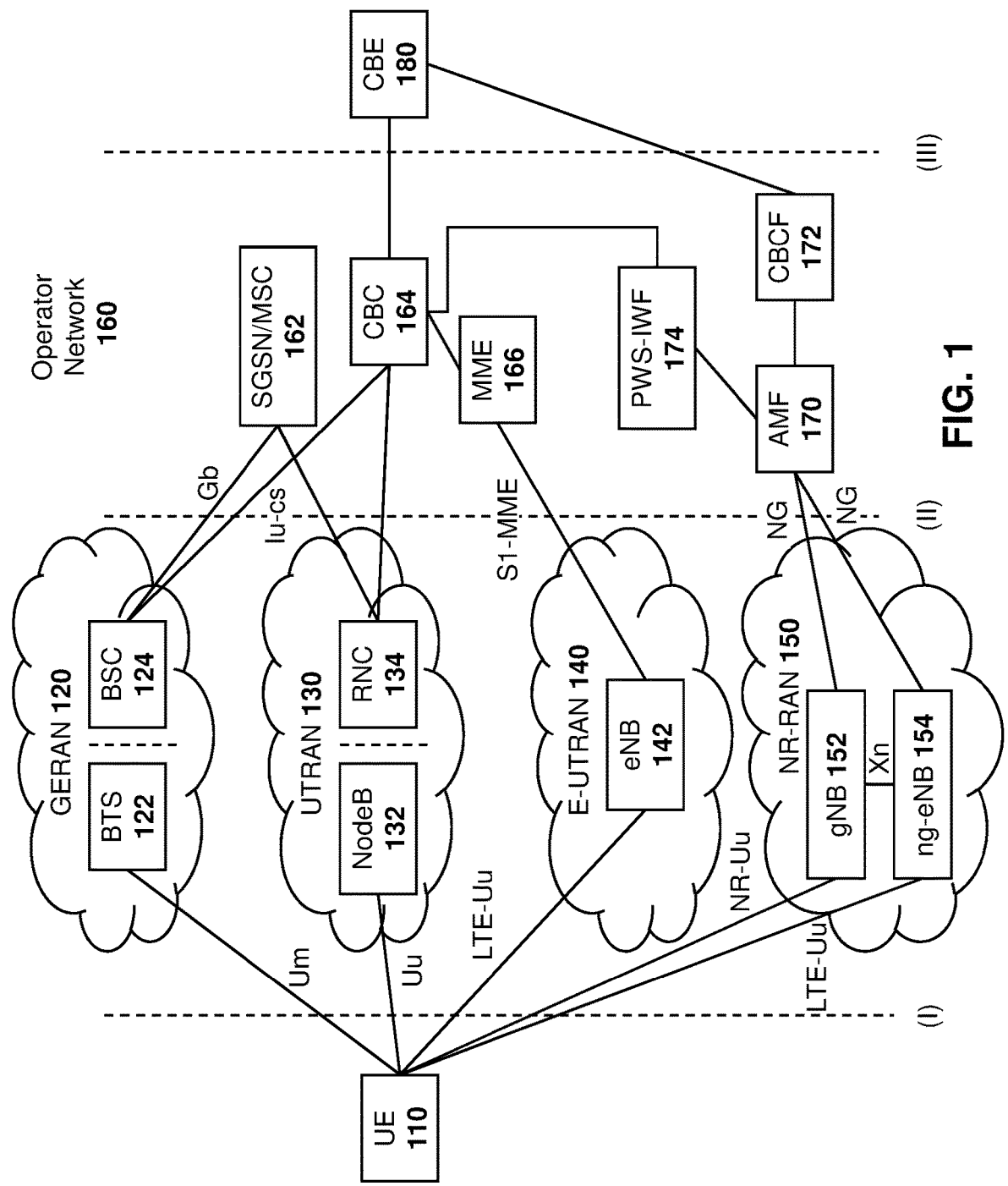
FIG. 1 is a block diagram showing communications between a cellular broadcasting entity and a user equipment.

The present disclosure provides a method at a user equipment, the method comprising: receiving at the user equipment over a first technology, an emergency notification, the emergency notification providing information for a second technology capable of carrying an emergency message; and activating the second technology using the information for the second technology to receive the emergency message.

The present disclosure further provides a user equipment comprising: a processor; and a communications subsystem, wherein the user equipment is configured to: receive over a first technology, an emergency notification, the emergency notification providing information for a second technology capable of carrying an emergency message; and activate the second technology using the information for the second technology to receive the emergency message.

The present disclosure further provides a computer readable medium for storing instruction code, which when executed by a processor of a user equipment cause the user equipment to: receive over a first technology, an emergency notification, the emergency notification providing information for a second technology capable of carrying an emergency message; and activate the second technology using the information for the second technology to receive the emergency message.

As indicated above, cellular coverage is not ubiquitous and cellular operators have little incentive to deploy PWS service as they generate zero or very low revenue and require significant resources compared to a single frequency modulation (FM) broadcast radio transmitter. Similarly, PWS services cost significant amounts of money for very little or zero return on investment and therefor there is no incentive for cellular operators to deploy PWS on a wide scale. In this regard, cellular operators are reluctant to upgrade PWS to support value-added information. In addition, during an active PWS alert the cellular device needs to continuously monitor and receive additional cellular system information in order to remain appraised of alert updates, this imposes additional impact on the device's battery power reserves.

Wireless local area networks provide very limited coverage and may not be secure. Further, when driving in a vehicle and receiving a PWS alert to a wireless device, reading such messages on a display may become a distraction to a driver and in many countries the use of a mobile device while driving may be illegal.

Cellular or local area network coverage may also be limited beyond normal deployment. For example, cellular coverage may be compromised if an emergency situation affects the ability to transmit. Factors that may affect such transmission ability may include natural disasters such as earthquake, which may damage a transmitting mast, or a long lasting power cut, for example.

In other cases, the use of current PWS mechanisms such as a Commercial Mobile Alert System (CMAS) may utilize a plurality of segments for conveyance of a complete warning message (i.e. a CMAS message length requires that is be segmented and transmitted in a number of messages to the device), where the segments need to be combined and reassembled before being forwarded to an upper layer entity for further processing. This may limit the timely delivery of a completely reassembled warning message when a device needs to wait for segments of the same message. Further, the level of detail that is possible to convey due to individual message size limitations may be small.

In some cases, a PWS message may include a Uniform Resource Locator (URL) within a message to direct users to a webpage for further information. However, such solution may also not be reliable. In particular, infrastructure and capacity of cellular radio networks to handle Internet access via a received URL address may not be possible due to loss of infrastructure or a reduction in radio coverage or associated connectivity and access issues. In addition, depending on the user scenario the user ability to select and/or access the URL may be compromised or restricted, for example when evacuating a location or driving a car. Hence, provision and availability of resources for user interaction in terms of requesting additional information may be limited or even unobtainable. Basically, a cellular or wireless local area network may not have the capacity needed to deliver webpages to all subscribers simultaneously, let alone stream audio or video or provide access to web or server based services.

The deployment of access barring mechanisms for the management and control to cellular or wireless local area networks during times of emergency or high system load may further limit the ability of users to gain additional information.

A server at the target of the URL address may also be inundated and unable to cope with a large number of accesses, and may possibly fail, thus denying all users the possibility to retrieve information.

In a further aspect, device power may be detrimentally impacted from monitoring and rereading system information for further updates when compared to, for example, listening to an FM radio broadcast. This may be particularly worse when coverage of the cellular network is compromised or patchy and the device continues to search for a cellular network when it has no cellular connection, which is a battery intensive process.

Therefore, during an emergency or public alert, reliance on a cellular system to provide alerts and safety information may be insufficient and may be detrimental to the ongoing performance of the cellular device.

The following describes behavior relating to the handling of emergency service, public warning system or public alerts advertised or indicated via a first technology to control reception of associated emergency service information via a second technology. As will be apparent to someone skilled in the art, the principles applied here to reception of emergency service, public warning system or public alerts may be applicable to any service deployed in a similar manner.

In accordance with the present disclosure, methods and systems are provided to allow for a cellular device capable of receiving PWS alerts or notifications to turn on and automatically tune a built-in or locally associated media technology receiver (e.g. a receiver of a $2^{nd}$ technology) in order to receive public service announcements pertinent to the ongoing alerts during an emergency or security situation. The cellular device may in some cases further change volume levels on the media device to ensure any audio can be heard. The PWS notifications may, for example include, but is not limited to, Earthquake and Tsunami Warning Systems (ETWS) or Commercial Mobile Alert Systems (CMAS) etc. The public service announcements may be made, for example, over an Emergency Alert System (EAS) and may consist of a combination of technology systems which may or may not be automatically configured and or coordinated.

The media technology receiver may be any other technology receiver (i.e. a receiver of a $2^{nd}$ technology), for example, be a Frequency Modulated (FM) or similar Very High Frequency (VHF) radio receiver, Satellite receiver etc., or tuner in some cases. Alternatively, other media technology may also be adapted in similar as to those described for FM, for example Amplitude Modulated (AM) radio receiver on the medium wave may be adapted to carry a data, and be controlled via the associated cellular device. Other forms of radio transmission may include satellite radio and use of a satellite radio receiver or digital audio broadcasting (DAB) and use of DAB radio receivers. Alternatively a media technology receiver may be WLAN modem capable of communicating with a WLAN network.

Application in principal of the embodiments described herein by other types of media technology receivers may also be envisaged, wherein a media technology receiver (e.g. a receiver of a $2^{nd}$ technology) is associated with a cellular device (e.g. a receiver of a $1^{st}$ technology), and the cellular device receives an indication which results in the turning on and automatic tuning or control of the media technology receiver for the purposes of receiving a coordinated media message. In particular, the media message relates to an emergency or alert notification.

In one case, the other technology may be integrated with the cellular device, and a controller for FM reception may be integrated within the device.

Alternatively, the 2nd technology or tuner may be part of an associated system or $2^{nd}$ device (e.g. a media device etc.) that the cellular device is connected to. The connection may, for example, be via a local wireless protocol such as Bluetooth™ or other short-range wireless communication technology. Such a connection may exist, for example, for the purposes of sharing audio components with the other system for reception of hands-free calls and listening to, for example, FM radio broadcasts. For example, a cellular device may be connected to a vehicle audio system (e.g. infotainment function) which includes a FM tuner in some cases. Alternatively, the device may be connected to the 2nd technology tuner or receiver via a wired connection. The wired connection may be a part of or a combination of internal circuitry or printed circuit board track or interconnecting cables carrying signals in accordance with wired connections such as a USB, firewire, etc.

In the case of the cellular device ($1^{st}$ device) being associated with a media device (a $2^{nd}$ device), the media device (e.g. FM) controller may either reside in the cellular device or may be located in the media device or receiver module or a part of the controller may reside in both devices. For example, a vehicle may have a VHF/FM radio head. The present disclosure provides for an interface to enable the coordinated operation and control between the two devices or systems.

Based on the above, the following acronyms will be utilized in the present disclosure.

TABLE 1

Acronyms

| Acronym/Abbreviation | Full text | Brief Description |
|---|---|---|
| ANQP | Access Network Query Protocol | A Wireless Local Area Network (WLAN) protocol that allows a WLAN enabled device to discover network parameters and characteristics, prior to the device attaching to a selected WLAN. It is a query response protocol. |
| AT | ATtention, | this two-character abbreviation is always used to start a command line to be sent from Terminal Equipment to a Terminal Adapter |
| CBC | Cell Broadcast Centre | |
| CBE | Cell Broadcast Entity | |
| CBS | Cell Broadcast Service | |
| EAP | Extensible Authentication Protocol | |
| FM | Frequency Modulation | Modulation scheme used for radio broadcasts in the VHF bands |
| RBDS | Radio Broadcast Data System | North American version of RDS |
| RDS | Radio Data System | Digital service run over FM radio broadcasts, transmitted within the baseband signal |
| TA | Terminal Adaptor, | e.g. a GSM data card (equal to DCE, Data Circuit terminating Equipment) |
| TE | Terminal Equipment, | e.g. a computer (equal to DTE, Data Terminal Equipment) |
| VHF | Very High Frequency | |

Cellular Public Warning Systems

PWS is currently defined in 3GPP TS 22.268: *"Public Warning System (PWS) Requirements"* version 14.1.0. This definition is without security and provides a framework for regional emergency services such as the Korean Public Alert System (KPAS), European warning system (EU-alert), CMAS and ETWS.

In CMAS, or as in the Canadian Wireless Public Alerting Service (WPAS), it is possible, but is not encouraged, to include an embedded URL or phone number in the alert message. The embedded URL allows a user to go to a website to obtain more feature rich content.

Reference is now made to FIG. 1, which provides an overview of a current system architecture for PWS. In particular, in the embodiment of FIG. 1, a mobile device such as a user equipment (UE) 110 may be any mobile device. Depending on the exact functionality provided, the user equipment may be referred to as a data messaging device, a two-way pager, a wireless e-mail device, a cellular telephone with data messaging capabilities, a wireless Internet appliance, a wireless device, a mobile device, a smartphone, a tablet, a laptop, a notebook, or a data communication device, a Cellular Internet of Things (CIoT) device, as non-limiting examples.

The UE 110 may communicate over a variety of wireless technologies. For example, if the UE is communicating via the Global System for Mobile communications (GSM) Edge Radio Access Network (GERAN) 120, then the UE may communicate over a Um interface with Base Transceiver System (BTS) 122. BTS 122 may further communicate with a Base Station Controller 124.

Alternatively, if UE 110 is communicating via a Universal Terrestrial Radio Access Network (UTRAN) 130 then it may communicate through a NodeB 132, which may communicate via a Radio Network Controller (RNC) 134. Communication with the UTRAN network 130 may be over a Uu interface.

Further, the UE 110 may communicate with an Evolved-UTRAN (E-UTRAN) 140. In this case, the UE 110 would communicate over a Long Term Evolution (LTE)-Uu interface with eNodeB (eNB) 142.

Further, the UE 110 may communicate with a Next Generation Radio Access Network (NG-RAN) 150. In this case, the UE 110 would communicate over a NR-Uu air interface with an gNB 152, or alternatively the UE 110 would communicate over a LTE-Uu interface with ng-eNB 154 (Next Generation eNB).

In the case of each of the GERAN 120, UTRAN 130, E-UTRAN 140 or NR 150, the message is then propagated to an operator network 160. In particular, from GERAN 120 and, in particular, from BSC 124, communication may be to a Serving General Packet Radio Service (GPRS) Service Node (SGSN) or Mobile Switching Center (MSC) 162. Alternatively or in addition, BSC 124 may communicate with the Cell Broadcast Center (CBC) 164.

Similarly, in UTRAN 130, RNC 134 may communicate using the SGSN/MSC 162 or CBC 164.

Similarly, in E-UTRAN 140, eNB 142 communicates via a Mobility Management Entity (MME) 166, which may then communicate with the CBC 164.

In NR 150, the gNB 152 or ng-eNB 154 may communicate using the Access and Mobility Management Function (AMF)/User Plane Function (UPF) 170, which may then communicate with the CBC, either directly or via the LTE-MME. For example, this is shown with AMF/UPF 170 communicating with PWS-Inter Working Function (IWF) 174, which communicates with CBC 164.

Alternatively, AMF 170 may communicate with Cell Broadcast Center Function (CBCF) 172.

CBC 164 or CBCF 172 may then communicate with a Cell Broadcast Entity 180.

In FIG. 1, the air interface between UE 110 and the access network comprises the broadcast interface for the cell broadcast service. PWS warning notification messages are broadcast to the UE 110 either via system information or, in the case of the ETWS primary notification for GERAN 120, may be done through paging messages. In either case, no additional security is applied to verify the authenticity or integrity of the message received over the broadcast interface. As an alternative to this the messages may be provided via dedicated messaging towards the UE.

CBC 164 is part of the core network and connects to the network entity. For GERAN, the CBC connects with the access network entity BSC. For UTRAN, the CBC 164 connects with the access network entity RNC 134. For the E-UTRAN, the CBC connects with the core network entity MME 166.

The Cell Broadcast Entity is on a national level and is outside of the scope of the 3GPP network. It is assumed that the CBE is responsible for all aspects of formatting the cell broadcast service including splitting of the CBS message into a number of pages and the actual signaling. It is also assumed for the purposes of the present disclosure that there may be many CBEs connected to a CBC 164.

FM Radio

Frequency modulated radio broadcasts are transmitted on VHF bands, typically in the range of 65 to 108 MHz, though this differs based on country or region. FM broadcasts by radio stations are used to carry commercial and public radio broadcasts worldwide.

Signals transmitted during FM broadcasts have long supported additional subcarrier services for the generation of additional services and opportunities for other revenue streams for the broadcast operators.

Figure 2:
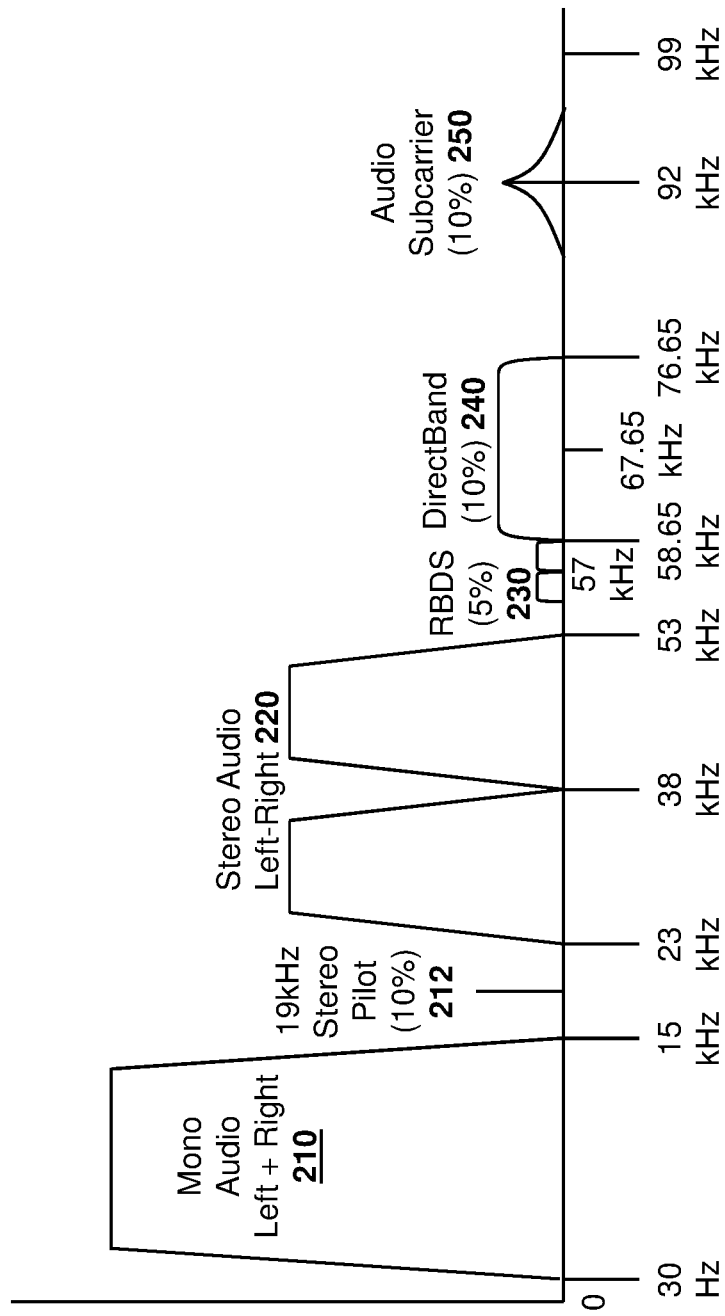
FIG. 2 is a plot showing an example frequency modulation broadcast radio spectrum allocation.

Reference is now made to FIG. 2, which shows an example of some of these subcarrier services, and how they fit within the baseband transmission.

In particular, as seen in FIG. 2, an example spectrum of the composite FM radio band signal is provided. In the embodiment of FIG. 2, mono audio left and right signals are provided as shown at reference 210.

A 19 kHz stereo pilot is shown with reference 212.

Between 23 kHz and 53 kHz, stereo audio left and right signals, as shown by reference 220, are provided.

Around the 57 kHz offset, a digital service known as a Radio Broadcast Data System (RBDS) 230 may be transmitted. RDBS is a North American standard and provides additional service information. In Europe, the equivalent is the Radio Data System (RDS) service. These digital services are detailed further in the disclosure below.

A DirectBand 240 is provided between 58.65 kHz and 76.65 kHz and an audio subcarrier is provided around the 92 kHz range, as shown with reference 250.

Typically, FM reception and receiver complexity is much cheaper, less battery intensive, and reception is less complex than reception of similar services via cellular receivers. Further, FM typically has a vastly wider coverage area than cellular networks and is typically broadcast from a limited number of physical sites in comparison with cellular networks.

Radio Data System (RDS)

RDS is a digital protocol which enables an FM radio station broadcaster to transmit a digital service using a 57 kHz subcarrier within the FM broadcast carrier for reception on RDS equipped FM receivers. The current RDS standard was developed and maintained by the RDS forum, and while it began in Europe, RDS is now widely adopted across Europe and is also increasingly popular in the Far East.

In North America, the Radio Broadcast Data System (RDBS) is the American equivalent of the Radio Data System, and is also gaining popularity. Currently, over 700 radio stations in the United States broadcast RDBS information on a regular basis. The two standards for RDS and RDBS are generally the same.

Some features that may be defined within RDS/RDBS transmission includes the following fields and features:

Programme Identification (PI)

This is an RDS data field which allows the receiving radio to display the name of the radio station e.g. in the UK, BBC Radio 2. When the radio moves out of the range of one transmitter the radio will seek the strongest signal which has the same PI code, allowing the radio to remain tuned to the same programme.

The PI code consists of four characters. Within the UK for example the first character indicates the country of origin the next one indicates the type of coverage and the final two characters are the programme reference. For example, BBC Radio 3 has the PI code C203 and BBC GLR has C311. Where C is for the UK and the second character "2" indicates a national station compared to "3" which indicates a regional station. For RBDS the encoding is slightly different and the PI code is determined by applying a formula to interpret the station's call sign.

Enhanced Other Networks (EON)

Most RDS tuners are now fitted with the EON facility, which offers the ability for local stations to 'break into' a national station's broadcast for the duration of a Traffic Announcement. When listening to a BBC national station, such as BBC Radio 2, EON announcement or indication will notify the radio about any traffic bulletins being broadcast by BBC stations in the local area.

Program Type (PTY)

The encoding of this field describes up to 31 predefined program types which allows users to find similar programming by genre (e.g., in Europe: PTY1 News, PTY6 Drama, PTY11 Rock music).

Note however special codes PTY30/31 are reserved for emergency announcements or alerts in the event of natural disasters or other major events or emergencies.

The RDS PTY codes have slightly different categorizations, depending on whether the stations are in Europe or North America. For example, reference is now made to Table 2.

TABLE 2

Emergency RDS PTY Codes

| | RDS PROGRAMME TYPE | |
|---|---|---|
| RDS PTY CODE | EUROPE | NORTH AMERICA |
| [ . . . ] | | |
| 30 | ALARM TEST | EMERGENCY TEST |
| 31 | ALARM | EMERGENCY |

As seen in Table 2, the categorizations are slightly different between the Europe and the North American systems.

Emergency Alert System (EAS)

The Emergency Alert System is a coordinated public warning system developed in the United States, which replaces the older Emergency Broadcast System. In addition to enabling the president of the USA or other agencies to address the entire country within 10 minutes, the system is also designed to support local or regional emergency alerts, including weather emergencies or security alerts.

EAS is jointly coordinated by the Federal Emergency Management Agency (FEMA), the Federal Communications Commission (FCC), and the National Weather Service (NOAA/NWS).

In 2008, the FCC began to work on another system for publicly alerting designed and targeted at smartphones meant to support the EAS. The Commercial Mobile Alert System (CMAS), now Wireless Emergency Alerts, made its debut around 2013 in various states. While such system operates independently from the Emergency Alert System, it may broadcast identical information.

Interaction with PWS such as FM broadcasts, using a system such as EAS, and a user device supporting cellular is currently not supported. Independent operation and duplicate messages during the same period of emergency or public alerts may add to confusion and not provide survivors of a natural disaster or emergency with optimal power efficient solutions.

Messages are transmitted via AM, FM, broadcast television, cable television and land mobile radio service, as well as VHF, Ultra High Frequency (UHF), and wireline video providers such as Fiber Optic Service (FiOS). Digital television, satellite television and digital cable providers, along with Sirius™ XM Satellite radio, In-Band On Channel (IBOC), Digital Audio Broadcasting (DAB), smartphones and digital radio broadcasters have been required to participate in the EAS since Dec. 31, 2006. Additionally, DirecTV™, Dish TV™ and all other Digital Broadcast Service (DBS) providers have been required to participate since May 31, 2007.

Regular tests are conducted on a weekly basis and rely on the transmission of header messages and sometimes tones.

Other emergency alert systems deployed globally include: Alert Ready (Canada), Emergency Cell Broadcast System (Philippines), Emergency Mobile Alert (New Zealand), Emergency Public Warning System (Alberta, Canada), J-Alert (Japan), Korean Public Alert System (Korea), LAT-Alert (Chile), Location Based Alerting System (Norway), National Message (Israel), NL-Alert (Netherland), Public Warning And Information System (Lithuania), Public Warning System (Taiwan), Public Warning System (UAE), Système d'alerte et d'information des populations (France), Wireless Emergency Alerts (US).

Integrated Commercial Mass Notification Systems

Several commercial operations have evolved over time, integrating a number of alert mechanisms. While many solutions are focused on commercial or large enterprise applications, some crossover to public warning systems. For example, one such crossover solution was introduced by AtHoc™ with an earthquake warning system deployed in Mexico. This was used successfully during the earthquake which occurred on Friday, Apr. 18, 2014.

The integrated AtHoc system features a number of aspects which provide a coordinated crisis communication and control system. It features an ability to coordinate geolocation targeting for alerts and announcements along with teleconferencing interfaces to enable parties to make announcements. Additional control aspects include access to social media, to fire panels, sirens, mobile apps, two-way public radio and other wearable devices.

However, such mass notification systems, while employing aspects of coordinated mass notifications, do not provide alerts to cellular systems such as ETWS or CMAS which can independently trigger or control reception of co-located or associated receivers capable of receiving emergency broadcasts sent via other systems such as those sent over FM radio broadcasts.

AT Commands

AT commands provide a solution to enable the upper layers of a user equipment or other mobile equipment to write data, read data or force execution of the procedure by a lower layers of such UE or ME. The upper layers may, for example include the application layers and lower layers, for example, may include a modem chipset. A summary of an architecture for AT commands is provided with regards to Table 3 and FIG. 3 below.

TABLE 3

Extract of 3GPP TS 27.007
3GPP TS27.007

The present document specifies a profile of AT commands and recommends that this profile be used for controlling Mobile Termination (MT) functions and GSM/UMTS network services from a Terminal Equipment (TE) through Terminal Adaptor (TA). . . . The present document assumes an abstract architecture comprising a TE (e.g. a computer) and a MT interfaced by a TA (see FIG. 1). The span of control of the defined commands should allow handling of any physical implementation that this abstract architecture may lead to:
  TA, MT and TE as three separate entities;
  TA integrated under the MT cover, and the TE implemented as a separate entity;
  TA integrated under the TE cover, and the MT implemented as a separate entity; and
  TA and MT integrated under the TE cover as a single entity.
The commands described in the present document may be observed on the link between the TE and the TA. However, most of the commands retrieve information about the MT, not about the TA.

As seen from Table 3 above, an excerpt from the 3GPP TS 27.007, "AT command set for User Equipment (UE)", for example as provided in version 15.1.0, March 2018, is provided which allow for control of mobile termination functions and GSM/UMTS network services from a terminal equipment through a terminal adapter.

Figure 3:
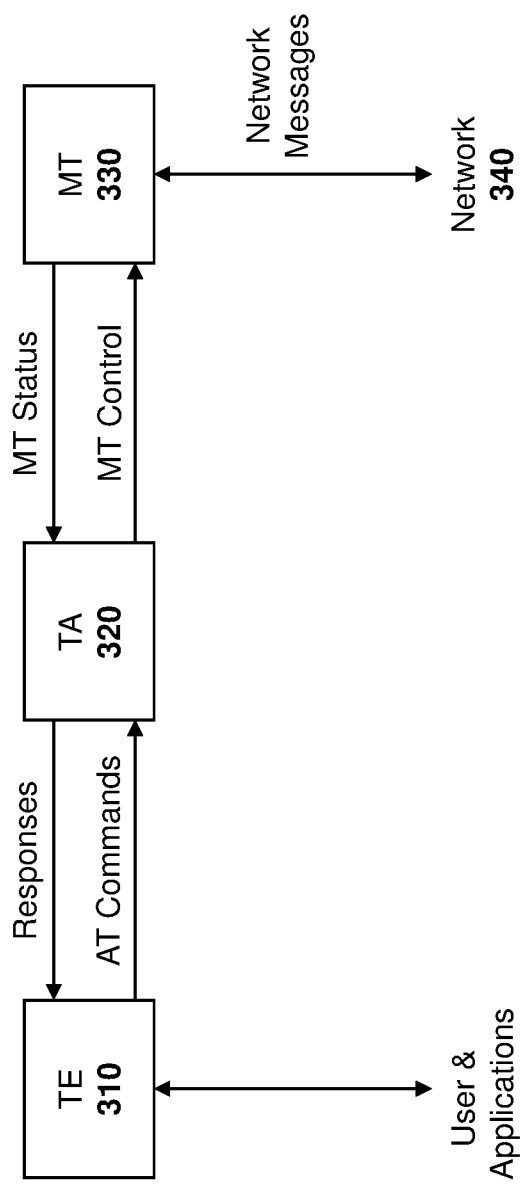
FIG. 3 is a block diagram showing elements for sending Attention commands and receiving responses.

Reference is now made to FIG. 3. In the embodiment of FIG. 3, Terminal Equipment (TE) 310 may interface with users and applications. The terminal equipment 310 may send AT commands to a Terminal Adapter (TA) 320. The Terminal Adapter may then send Mobile Terminal (MT) control commands to the Mobile Terminal 330.

The Mobile Terminal 330 may then return the mobile terminal status to the Terminal Adapter 320. The Terminal Adapter 320 may then provide responses back to the Terminal Equipment 310.

The Mobile Terminal 330 provides network messages to a network 340.

WLAN ANQP

Figure 4:
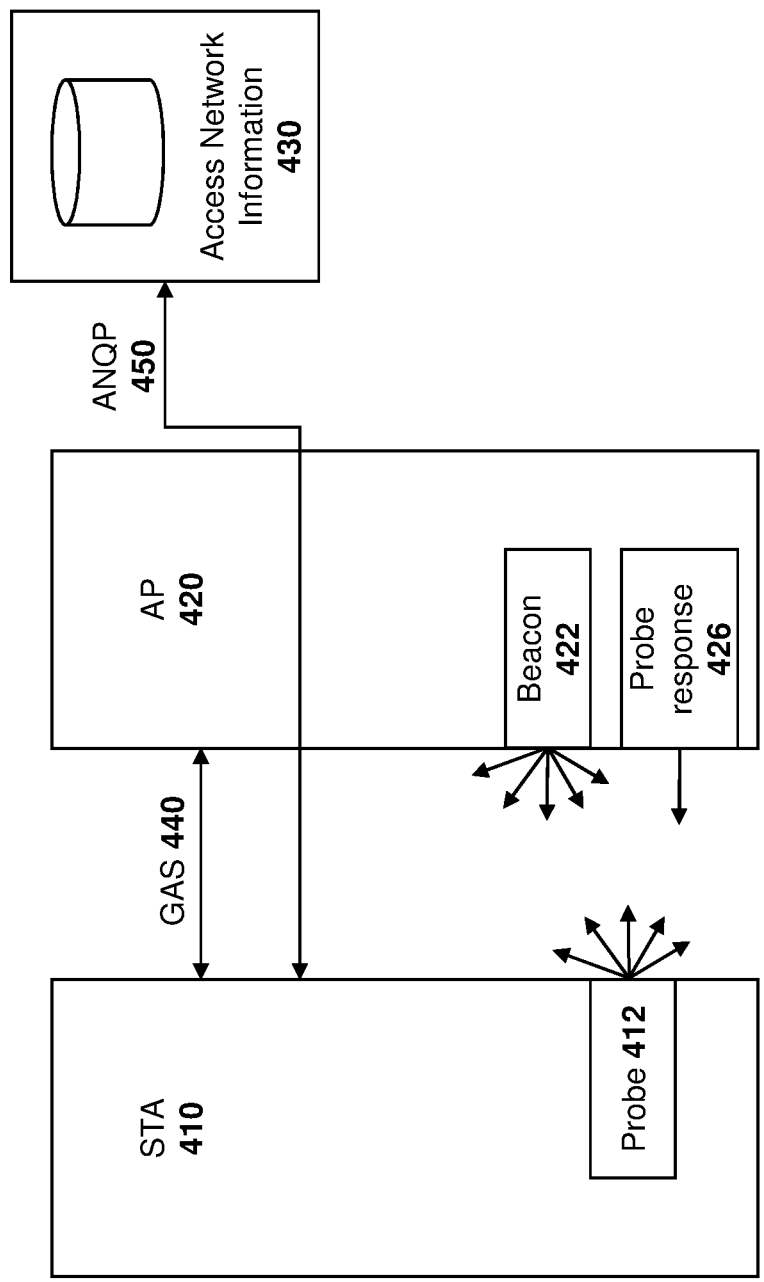
FIG. 4 is a block diagram showing WLAN access network query protocol.

Referring to FIG. 4, the IEEE 802.11 ANQP is one example of an advertisement protocol transported between mobile stations (STAs 310) and access points (APs 320). The STA is the equivalent of a UE.

In the embodiment of FIG. 4, a Generic Advertisement Service (GAS) 440 may be provided between STA 410 and AP 420. For example, STA 410 receives a beacon 422 from AP 420. Further STA 410 may send a probe 412 and listen for a probe response 426.

ANQP operates as a simple query and response protocol that is used by a mobile device to discover a range of information 430 from an "Access Network" (AN) server. This AN server is either co-located with an AP or is located within the Local Area Network (LAN), which is the layer 2 network to which the AP is connected.

ANQP 450 allows a mobile device (e.g. STA, UE) to determine the properties of the LAN before starting or at any time after the association procedure.

Information obtained through ANQP 450 can include: network identifiers, roaming relationships, supported security methods (IEEE 802.1X and web-based authentication), available service providers, among other options. This enables ANQP to be a very powerful protocol capable of discovering information about WLANs, e.g. prior to the mobile device establishing network connectivity.

Currently there are more than 20 individual ANQP-elements defined in IEEE 802.11 and various Wi-Fi Alliance programs (e.g. Hotspot 2.0), each one capable of retrieving different information (reports) from the LAN, for example:
  a) AP Location
  b) AP Venue Name
  c) Service Provider availability To discover each ANQP-element, the UE (STA) sends an ANQP Request to the AN server via an AP with an integer identifier (Info ID) corresponding to the desired information report. The AN server AP then responds, via the AP, with an ANQP-element containing that information report. The AN server may also discover the required information from either the WLAN or an external network to which it is attached.

For example, the UE sends the integer 256 in an ANQP request to the AN server to obtain the location (latitude and longitude) information of that AN server in an ANQP response message.

WLAN Broadcast Services

Alternatively, an WLAN AP may broadcast some services or information in order to provide services or service availability information. The broadcast of emergency or public warning system alerts can be transmitted in this way. The broadcast information may be received by associated and/or unassociated STAs.

Extensible Authentication Protocol (EAP)

The Extensible Authentication Protocol, as the name suggests, is an extensible authentication framework. It provides the necessary tools to incorporate other authentication schemes into the basic messaging structure. There are numerous different EAP mechanisms defined. EAP is, for example, described in the Internet Engineering Task Force (IETF) Request for Comments (RFC) 3748, "Extensible Authentication Protocol (EAP)", June 2004. A diagrammatic view of how the EAP framework can be used in a cellular device can be seen in FIG. 5.

Figure 5:
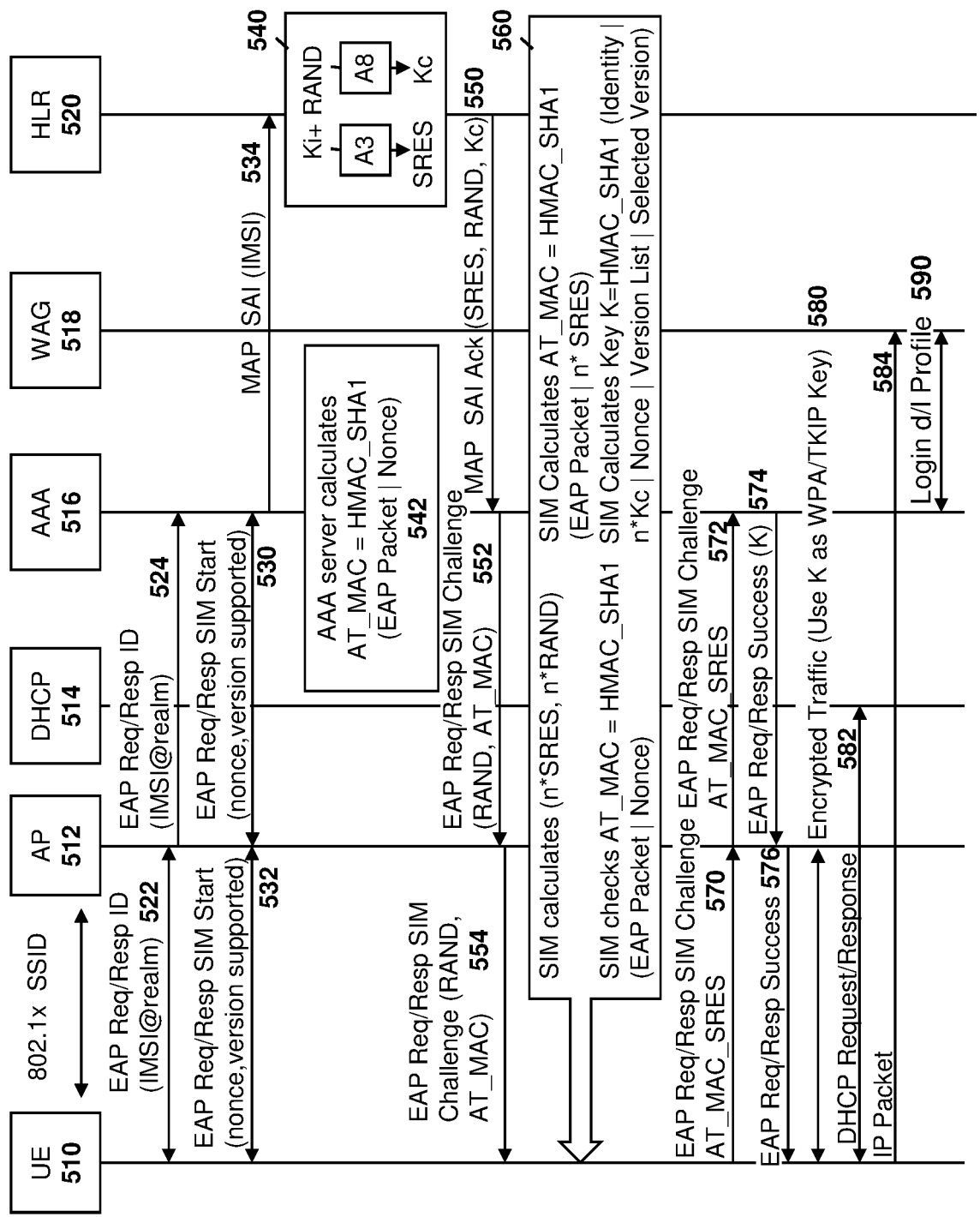
FIG. 5 is data flow diagram showing Extensible Authentication Protocol Subscriber Identity Module.

Reference is now made to FIG. 5. In the embodiment of FIG. 5, a UE 510 includes a mobile equipment (ME) as well as a SIM. UE 510 communicates with Access Point (AP) 512, for example utilizing an 802.1x Service Set Identifier (SSID).

Further, access point 512 may communicate with network elements, including DHCP Server 514, AAA Server 516, WLAN Access Gateway (WAG) 518, and Home Location Registry (HLR) 520. DHCP Server 514 will be understood by those in the art to be a note implementing DHCP protocol. Similarly, AAA Server 516 will be understood by those in the art to be a note implementing AAA protocol.

Registration starts by an Extensible Authentication Protocol (EAP) Req/Resp ID message 522 being sent between the UE 510 and AP 512. Message 522 may include an identifier (e.g. Private user identity) such as the International Mobile Subscriber Identity (IMSI) which may be associated with a realm.

AP 512 then forwards message 522 to AAA 516, as shown by message 524.

On receipt of message 524, the AAA 516 and AP 512 exchange an EAP Req/Resp SIM Start message 530 which may include a nonce and a version support.

AP 512 may then forward message 530 to UE 510, shown as message 532.

AAA 516 may further send a Mobile Application Part (MAP) Send Authentication Information (SAI) (IMSI) message 534 to HLR 520.

Based on message 534, HLR 520 generates keys, as shown by block 540.

Further, AAA 516 may calculate the AT_MAC=HMAC_SHA1 (EAP Packet|Nonce), as shown at block 542.

HLR 520 provides the keys back to AAA 516 as a MAP SAI Ack (SRES, RAND, Kc) message 550.

AAA 516 then provides an EAP Req/Resp SIM Challenge message 552, including the RAND and the AT_MAC calculator at block 542 to AP 512.

Message 552 is then forwarded to UE 510 as message 554.

The SIM on UE 510 may then calculate encryption parameters, as shown by block 560 and may provide a response 570 back to AP 512. The response 570 may include the AT_MAC_SRES.

The response 570 is then forwarded by AP 512 to AAA 516, as shown by message 572.

On checking the response 572, AAA 516 may then send an EAP Req/Resp Success message 574 to AP 512. Message 574 may include a key (K).

Message 574 is then forwarded by AP 512 to UE 510 as message 576 in the embodiment of FIG. 5.

Subsequently, encrypted traffic may be passed between UE 510 and AP 512 using K as the WPA/TKIP Key, as shown with arrow 580.

UE 510 may then provide a DHCP Request/Response 582 to DHCP 514.

UE 510 may then provide IP Packet 584 to WAG 518.

Subsequently, a Login d/I Profile 590 may be exchanged between WAG 518 and AAA 516.

3GPP defines three EAP methods that can be used in a UE. A first is EAP-Authentication and Key Agreement (AKA), described for example in IETF RFC 4187, "Extensible Authentication Protocol Method for 3rd Generation Authentication and Key Agreement (EAP AKA)", January 2006. A second is EAP-Subscriber Identity Module (SIM), described for example in IETF RFC 4186, "Extensible Authentication Protocol Method for GSM Subscriber Identity Modules (EAP-SIM)", January 2006. A third is EAP-AKA', described for example in IETF RFC 5448, "Improved Extensible Authentication Protocol Method for 3rd Generation Authentication and Key Agreement (EAP-AKA)", May 2009.

The EAP-SIM authentication mechanism has been generally considered by the experts in the subject area to have been compromised and therefore no longer safe to use, so only EAP-AKA and EAP-AKA' are typically used to access an EPC/EPS core network.

Once EAP authentication has been successful, the UE can then establish IP connectivity from the WLAN network e.g. using DHCP. Once IP connectivity has been established on the WLAN network, an ePDG can then be selected.

Common Alerting Protocol (CAP)

The Common Alerting Protocol is a common eXtensible Markup Language (XML) based data format for exchanging public warnings and emergencies between alerting technologies. CAP allows a warning message to be consistently disseminated simultaneously over many warning systems to many applications, such as EAS public alerts. CAP increases effectiveness to distribute messages across systems and simplifies the task of activating a warning for the responsible officials.

The CAP specification, version 1.2, has been available since July 2010 at the OASIS website.

Several countries are in the process of or have adapted to the CAP. For example, Canada's PWS system, Alert Ready, is a national public warning system based on CAP-CP and was officially launched in March 2015. Participation in the system by all broadcasters and television providers is mandated by the Canadian Radio Television and Telecommunications Commission (CRTC).

Receiving Emergency Public Warnings on a First Technology Triggering Reception of an Emergency Message from a Second Technology In accordance with one embodiment of the present disclosure, an emergency public warning may be received on a first technology which may trigger the reception of an emergency message from a second technology. For example, in one case the first technology includes a cellular or WLAN technology which triggers reception of an emergency message from the FM radio transmission, which comprises the second technology. However, such first and second technologies are merely provided as examples and in the present disclosure the first technology may be any technology with which a mobile device or user equipment may receive a warning and the second technology may be any technology on which the emergency message may be received.

Figure 6:
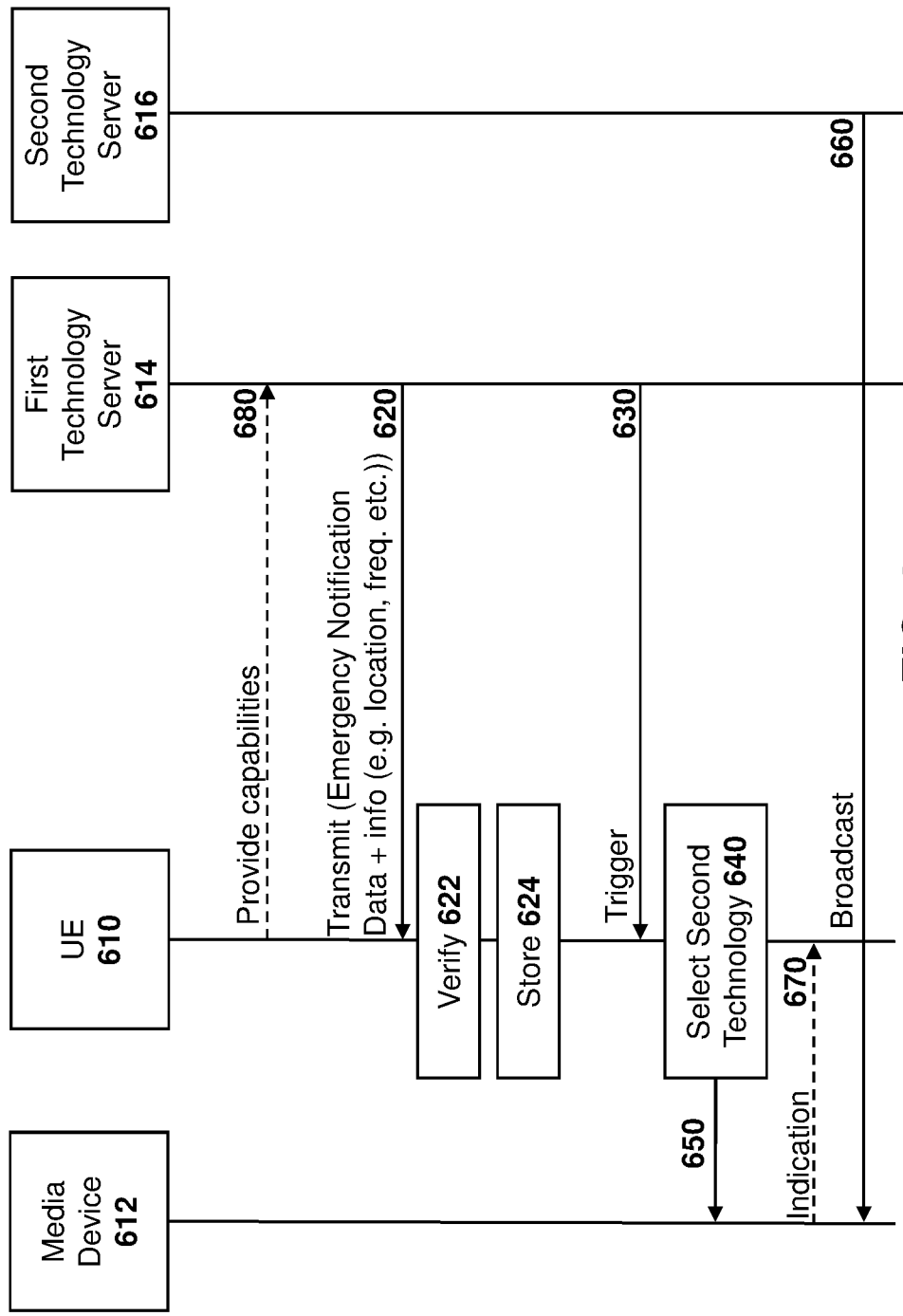
FIG. 6 is a dataflow diagram showing the obtaining of data and triggers from a first technology to tune an integrated or external media device to a second technology.

Reference is now made to FIG. 6. In the embodiment of FIG. 6, a UE 610 (a $1^{st}$ device) may be any device capable of receiving warnings over a first technology. For example, UE 610 may be a mobile device, smartphone, cellular telephone, radio receiver, among other such technologies.

UE 610 may be associated with a media device 612. For example, in one embodiment media device 612 may be a FM receiver (a $2^{nd}$ device). However, in other embodiments media device 612 could be any device capable of receiving an emergency message over the second technology.

Media device 612 may, in some embodiments, be integral to UE 610. For example, UE 610 may have a built-in FM receiver and chipset. In other embodiments, media device 612 may be external to UE 610 but may be controlled through UE 610. For example, UE 610 may have a Bluetooth™ or other wired or wireless communications connection to media device 612. For example, this may occur in a vehicle in which the UE may control the radio of the vehicle through a Radiohead interface. Other options are possible.

In the embodiment of FIG. 6, a first technology server 614 is utilized to provide information including a trigger to UE 610 over a first technology. A second technology server 616 is utilized to provide the emergency message over the second technology. In the examples below, the first technology may be a cellular or WLAN technology and the second technology may be an FM, VHF or UHF signal. However, such examples are not limiting and the present disclosure does not rely on such technologies to deliver the triggers or messages.

In the embodiment of FIG. 6, the first technology server 614 may provide a transmission 620 to UE 610. The transmission may occur, for example, in a wide area network and contain message information that allows the receiving UE 610 to find a second technology over which to receive data. For example, the information regarding the second technology may include emergency notification data which may include public warning information.

Further, in some cases, the message 620 may include information about the second technology. Such information may include, but is not limited to, the geographical area for the secondary technology, frequency information, station or network identity information, among other data which is associated with such geographic areas and signature (e.g. certificate). However, in some cases the information may include a prioritized list of stations or frequencies. Other examples are possible.

Message 620 may contain multiple entries for different geographic areas, for example frequencies and station identifiers. In some cases, message 620 may comprise a single message between the first technology 614 and the UE 610. In other embodiments the message 620 may be broken into multiple/a plurality of messages. The multiple entries provided in message 620 could describe information on multiple secondary technologies.

Once message 620 is received, the UE 610 then verifies the message, as shown by block 622. The verification could indicate whether the information received over the wide-area link is from a trusted source and has not been modified. For example, the message 620 may be signed by the first technology server 614 and the verification at block 622 may verify the signature of server 614. In other cases, integrity checking can be provided to ensure that the message has not been modified. Other options are possible.

Once the message is verified, the UE 610, at block 624 may then store the information. Data may be stored, for example, in any tangible, non-transitory storage medium. Such storage medium could include, but is not limited to, the Universal Integrated Circuit Card (UICC) application that is inserted into the Mobile Equipment (ME) or the Enhanced Universal Integrated Circuit Card (EUICC) application in the ME. In other embodiments, the data could be stored in memory on ME 610. In other embodiments, the data can be stored in a TA memory. In other embodiments the data can be stored in TE memory. Other examples are possible.

The storage may be for each received entry and a related geographical area, time, frequency information and station or network identity depending on the data received in message 620. The UE will then use the geographic area information once any triggers are received, as described below. The UE may determine which area it is in depending on various technologies, including utilizing a Global Navigation Satellite System (GNSS) such as a Global Positioning System (GPS) in one case. In other embodiments, the geographic location may be identified based on cellular base station identities, service set identifiers (SSIDs) among other options or using other wireless technologies that contain location information.

As described below, based on the trigger and/or the geographic location, the UE may then activate the second technology. Activation could include any one of, but is not limited to, turning on a second technology, listening and tuning to an identified frequency information, among other options. Turning on a second technology could imply the starting of listening (monitoring) or in some cases providing power to a circuit for the second technology.

At some point, the first technology server 614 may provide a trigger 630 to UE 610. The trigger could be a trigger for the reception of an emergency notification.

Based on reception of the trigger 630, the UE 610 may select a second technology as shown at block 640. In particular, the selection of the second technology may use various criteria. The criteria selection may for example could use a prioritized list of secondary technologies in one case.

Figure 7:
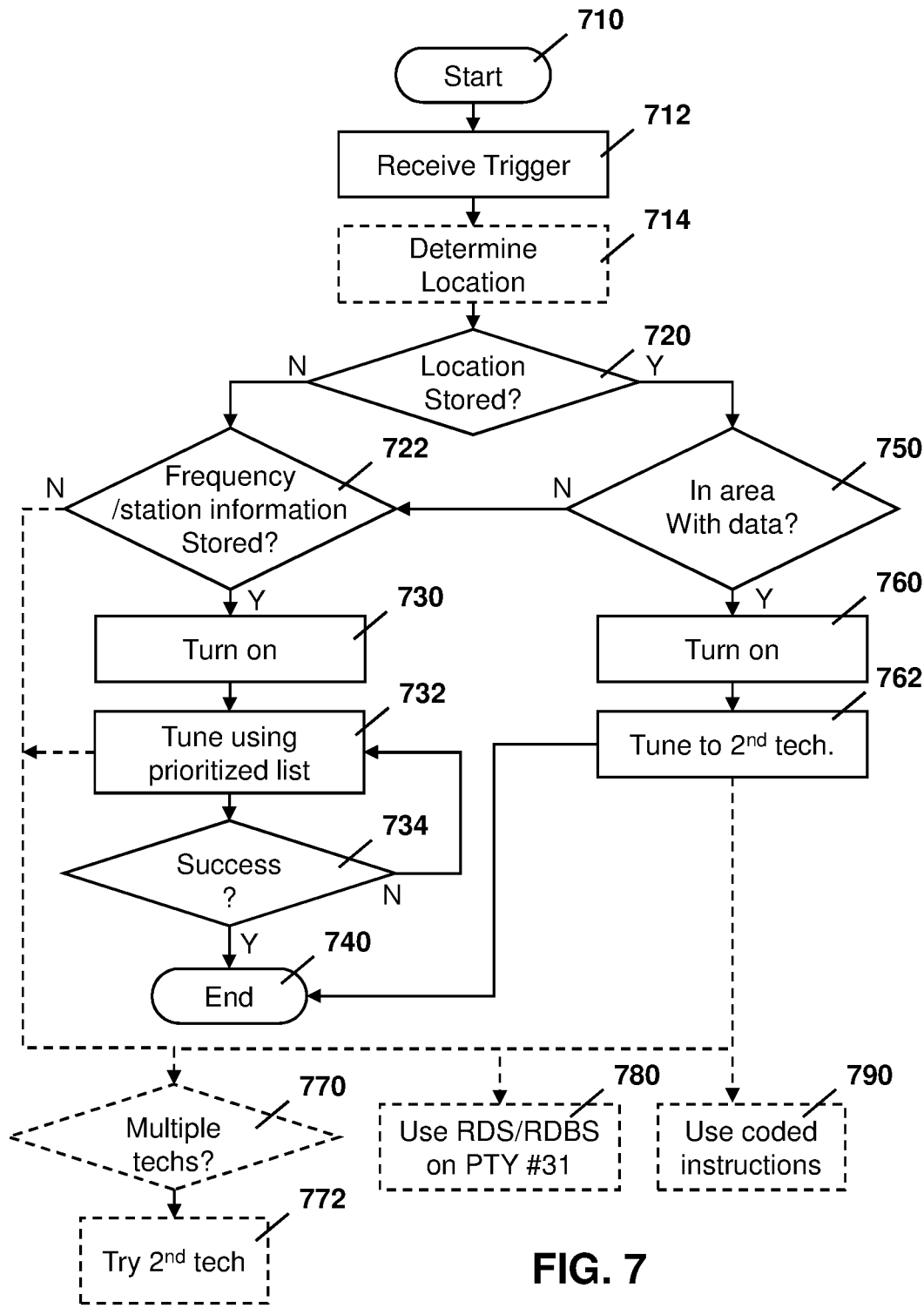

In particular, the selection at block 640 may be done in accordance with FIG. 7 in one embodiment.

The process of FIG. 7 starts at block 710 and proceeds to block 712 in which a trigger is received.

From block 712 the process proceeds to block 714 in which the device may optionally determine its location if not already known.

The process may then proceed to block 720 in which a check is made to see whether or not geographical information is stored. If not, then the process may proceed to block 722 in which a check is made to determine whether the frequency or station information is stored for one or more entries.

If the check at block 722 determines that frequency or station information is stored for one or more entries the process proceeds to block 730 in which the receiver for the second technology may be turned on if not already on. The process may then proceed to block 732 in which the second technology is tuned using a frequency or station information received on the first technology. For example, the tuning may be done based on a prioritized list of frequencies or station identifiers received in message 620, where the station identifier may have none, one or more associated frequencies.

The process then proceeds to block 734 in which a check is made to determine whether the tuning successfully receives emergency messages. If not, then the process may proceed back to block 732 in which the tuning may try the next stored frequency or station entry.

From block 734, if the tuner has successfully tuned to the emergency message then the process proceeds to block 740 and ends.

Conversely, from block 720, if the geolocation for the location of the UE is stored then the process proceeds to block 750. At block 750 a check is made to determine whether the geographic area has data on frequencies or station identifiers stored. If not, the process may proceed to block 722 and continue to tune based on entries stored previously for other geographic locations.

Conversely, if the area has data stored then the process proceeds to block 760 in which the second technology tuner is turned on, if not already on. The process then proceeds to block 762 in which the second technology is tuned to the station for which information is received and stored via the first technology.

The process then proceeds to block 740 and ends.

If there are no frequencies or station identities stored for one or more entries at block 722, or if there are no successes when tuning at either block 732 or block 762, then there are various options for the UE.

In one case, the process may proceed to block 770 and check whether multiple technologies are advertised, in which case the process may proceed to block 772 and the device would attempt to access the next matching secondary technology on the list.

Alternatively, the process may proceed to block 780 in which the UE could detect a PTY #31 signal within the RDS/RBDS broadcast of an FM station to tune to an emergency broadcast.

Alternatively, a list of stations authorized as EAS stations per geographic area could be stored on the UE in which case the process may proceed to block 790 and utilize these stored stations for tuning the FM broadcast in some cases.

From each of block 772, 780 or 790 the process may proceed to block 740 and end (not shown).

The data received at message 620 may be formed in various ways. For example, message 620 may include an entry identifier or number, which may include geographic information, frequency information and station or network identities for each entry identifier.

Further, the data at message 620 may include optional digital signature information. A digital signature signing some or all of the received information may indicate that such information is from a trusted source. The digital signature may be similar to that used in a cell broadcast as for example defined in 3GPP TS 23.041, "Technical Realization of Cell Broadcast Service (CBS)". In one embodiment the digital signature may include an octet 8 to 50 and bits 1 to 8. This field may contain a 43 byte digital signature in some cases.

The data at message 620 may further optionally include a source identifier. This is the identity of the trusted source. Alternatively, the source identifier can be similar to a message identifier as defined in 3GPP TS 23.041, ibid, which identifies the source and type of the cell broadcast system message.

Other additional information may also be provided in some cases. For example, information may include whether data can be displayed on the device, the type of audible notification to be played, if the device is allowed to act on information received, among other such information.

For example, utilizing the embodiments of FIGS. 6 and 7 above, one specific case would be an emergency public warning over cellular or WLAN technology triggering reception of an emergency message from an FM radio transmitter. In this case, a cellular network may be enabled to provide to cellular UEs an indication of the availability of specific FM radio broadcasts for reception of public safety or service announcements. The indications could include FM frequency, station identity and possibly time of broadcasts as a means to identify and speed up pertinent reception via the FM radio broadcast.

In some cases, indications could be embedded within existing PWS messages. For example, this may be a CMAS message. The embedded information could allow the user to enable and tune an identified station by selecting a link within the message.

Alternatively, a separate flag or indicator could be sent on the cellular broadcast channel, possibly within system information to indicate reception via FM channels, or additionally or more specifically which channel and when an FM radio station is broadcasting an emergency alert broadcast message.

In a further alternative embodiment, a command message may be encoded within the radio resource control (RRC) message. The encoding may possibly be at a higher layer, non-access stratum message within a transparent RRC container.

On reception of the message, the UE decodes the message and subsequently may enable and tune the device FM receiver to the required FM frequency. In addition, the UE may set a volume control level in the $2^{nd}$ device so that if the $2^{nd}$ technology contains audio information that it may be heard.

In a further embodiment, the tuning of the FM receiver to an indicated station could entail the use of RDS as an indication within FM radio reception. While the device as described above could initially tune to a frequency on detection of the trigger via the first technology, the cellular, the device could further decide not to have the received FM radio station audio heard or set a volume level of the FM radio station. This may be accomplished by muting the volume or not enabling the audio baseband path or sending the received audio to the speaker system. While continuing to receive the FM broadcast the device can monitor the signal until a specific RDS indication or other broadcast trigger is received on the FM receiver. Upon reception and detection of the RDS signal, the device could then additionally activate the speaker of the audio system to enable the device to broadcast the detected RDS announcement. Activation of the speaker may also include an audio level in terms of decibels or a numerical value that upon reception by the $2^{nd}$ device is a known volume level. This volume level may be a higher level than the setting that the device was normally operating at if already turned on.

Therefore, referring again to FIG. 6, once second technology is selected at block 640, the UE could interact with media device 612, as shown with message 650 to tune the media device to the correct frequency or station.

The media device 612 could then receive the emergency message, for example as broadcast by second technology server 616, shown with message 660.

On reception of the RDS indication and after the message is started to be played out on the second technology, the first technology may stop listening and decoding the PWS information that triggered the activation of the second technology. This may be achieved by the second technology indicating or passing a message to the first technology indicating that it is receiving the emergency or alert message or indication.

The first technology may stop listening for a permanent or temporary basis. For example, in the case of a temporary break, a timer may be used or an activation trigger may be used or passed to the first technology e.g. from the second technology, to trigger or start the first technology again in order that it listen for the emergency or public alert broadcast trigger or indication. For example the indication may be an ETWS indicator or CMSA indicator. On reception of the indication, the first technology may receive the PWS broadcast notifications or messages as indicated. Alternately, the first technology receiver may subsequently, automatically receive the first technology PWS notifications without needing to receive the broadcast trigger or indication in this case.

Trigger Reception

From FIG. 6 above, the server for the first technology 614 may send trigger 630. Various options for such trigger exist depending on the technology.

In particular, if the first technology server 614 communicates over a cellular connection with UE 610 then the trigger may be over Long Term Evolution (LTE) signaling.

The device, on reception of the LTE notification indication within a paging message, starts to receive the indicated emergency notification message. In an EUTRAN operating according to LTE specifications of 3GPP, as for example provided in 3GPP TS 36.300 and the 3GPP TS 36 Series Protocol Specifications, on reception of an etws-Indication within a paging message, causes a UE to start receiving the ETWS notification message in accordance with system information acquisition procedures.

Similarly, for a cmas-Indication received via a paging message, the UE will start receiving the CMAS notification messages in accordance with the system information acquisition procedure.

The specific notification messages are broadcast within an LTE network or EUTRAN via the system information messages and are scheduled by the system information scheduling information messages.

Conversely, if the trigger is received over WLAN or a similar Institute for Electrical and Electronics Engineers (IEEE) 802.11 technology, the device may receive an Emergency Alert Identifier element in a beacon frame from the access point or a probe response. The Emergency Alert Identifier element indicates there are emergency alert messages.

Activation of the Second Technology

In the examples herein, the second technology is described as an FM receiver. However, the techniques presented in accordance with the embodiments described herein can be used for other types of secondary technologies.

A device supporting an FM receiver capable of receiving Emergency Alert System or other identified emergency related information as encoded or broadcast by an FM radio broadcast system may be able to control and/or operate the FM receiver by commands or information received by cellular system signaling messages or notifications. The emergency information may, for example, be signaled via RDS using a Program Type Code (PTY) #31.

In a first embodiment, the activation of the second technology may proceed via existing Emergency Alert Indications. In particular, a device supporting an FM receiver, or capable of supporting an associated FM receiver and is connected to an FM receiver via a wired or wireless connection, and which is ETWS or CMAS capable may utilize the associated alerts, indications or warning systems as sent by the cellular system. A device is ETWS or CMAS capable if it is capable of receiving emergency or public warning system messages or information. The alerts may for example use an etws-Indication or cmas-Indication as a trigger to receive additional notification information related to the use of an associated FM receiver.

For an IEEE 802.11 capable device, the trigger may be the reception of an emergency alert identifier element as described above.

Thus, for a device with this capability the reception of an existing cellular alert indication such as etws-Indication or cmas-Indication by a device, or an Emergency Alert Identifier for a WLAN system, causes the activation and operation of the associated FM receiver. The device radio protocol of the device receiving the indication message notifies the upper layer protocol. The device upper layer communicates with an FM receiver controller to control the FM receiver, turning it on if not already on, and tuning the FM receiver frequency for the purpose of receiving designated emergency broadcasts or Emergency Alert System messages via the associated FM receiver.

The FM receiver controller may control the FM receiver tuning by looking for a specific RDS encoded message within FM broadcasts. For example, the message may be a PTY #31. Alternative tuning control mechanisms may be used by tuning to an identified frequency or station identifier.

In a further embodiment, rather than using existing indications, a new emergency alert indication may be created. In particular, an alternative to using the existing emergency or PWS alert indication is the introduction of a new public warning system alert or EAS indication for activation of an associated FM receiver. For example, in the text below, the new alert is referred to as an fm-Indication or fmeas-Indication. These are merely provided as examples.

The new indication may be introduced into cellular signaling in order to trigger the device to activate and/or control the reception of the emergency FM radio broadcasts.

The new indication may be transmitted within the paging message in a similar manner to that for current etws-Indication or cmas-Indication messages.

For an IEEE 802.11 capable device, a modified "Alert Hash Identifier" subfield within an Emergency Alert Identifier element may be used as a new indication. The value of this subfield may be set to 0 or $2^{64}-1$ or another similarly suitable eight octet value to indicate that the IEEE 802.11 capable device should activate the FM receiver.

On receiving the new PWS/EAS or FM indication message, a device supporting an FM receiver, or capable of supporting an associated FM receiver and which is connected to an FM receiver via a wired or wireless connection, causes the activation and operation of the associated FM receiver. Thus, when a device receives a message such as fm-Indication or fmeas-Indication, this will cause the operation of the associated FM receiver.

The device radio protocol receiving the indication message notifies the upper layer protocol of the device. The device upper layer communicates with an FM receiver controller to control the FM receiver, turning it on if not already turned on, and tuning the FM receiver frequency for the purpose of receiving designated emergency broadcast EAS messages via the associated FM receiver.

The FM receiver controller may control the FM receiver tuning by looking for a specific RDS and coded message within the FM broadcast. For example, this may be a PTY #31. Alternatively, tuning control mechanisms may be used by tuning to an identified frequency or station identifier.

An example of a message definition for an fmeas-Indication is provided in bold in Table 4 below.

TABLE 4

RRC Paging Message with new FM/EAS broadcast indication

```
3GPP TS36.331
6.2.2 Message definitions
The Paging message is used for the notification of one or more UEs.
    Signalling radio bearer: N/A
    RLC-SAP: TM
    Logical channel: PCCH
    Direction: E-UTRAN to UE
                                    Paging message
-- ASN1START
Paging ::=                          SEQUENCE {
    pagingRecordList                    PagingRecordList            OPTIONAL,    -- Need ON
    systemInfoModification              ENUMERATED {true}           OPTIONAL,    -- Need ON
    etws-Indication                     ENUMERATED {true}           OPTIONAL,    -- Need ON
    nonCriticalExtension                Paging-v890-IEs             OPTIONAL
}
Paging-v890-IEs ::=                 SEQUENCE {
    lateNonCriticalExtension                OCTET STRING            OPTIONAL,
    nonCriticalExtension                    Paging-v920-IEs         OPTIONAL
}
Paging-v920-IEs ::=                 SEQUENCE {
    cmas-Indication-r9                  ENUMERATED {true}           OPTIONAL,    -- Need ON
    nonCriticalExtension                Paging-v1130-IEs            OPTIONAL
}
Paging-v1130-IEs ::=                SEQUENCE {
    eab-ParamModification-r11           ENUMERATED {true}           OPTIONAL,    -- Need ON
    nonCriticalExtension                Paging-v1310-IEs            OPTIONAL
}
Paging-v1310-IEs ::=                SEQUENCE {
    redistributionIndication-r13        ENUMERATED {true}           OPTIONAL,    --Need ON
    systemInfoModification-eDRX-r13         ENUMERATED {true}           OPTIONAL,    -- Need ON
    nonCriticalExtension                    SEQUENCE { }                OPTIONAL
}
Paging-vxyz-IEs ::=                 SEQUENCE {
    fmeas-Indication-rx                     ENUMERATED {true}       OPTIONAL,    --Need ON
    nonCriticalExtension                SEQUENCE { }                OPTIONAL
}
PagingRecordList ::=                    SEQUENCE (SIZE (1..maxPageRec)) OF
PagingRecord
PagingRecord ::=                        SEQUENCE {
    ue-Identity                             PagingUE-Identity,
    cn-Domain                               ENUMERATED          {ps, cs},
    ...
}
```

TABLE 4-continued

RRC Paging Message with new FM/EAS broadcast indication

```
PagingUE-Identity ::=              CHOICE {
     s-TMSI                             S-TMSI,
     imsi                               IMSI,
     ...
}
IMSI ::=                           SEQUENCE (SIZE (6..21)) OF IMSI-Digit
IMSI-Digit ::=                     INTEGER (0..9)
-- ASN1STOP
```

Paging field descriptions
cmas-Indication
If present: indication of a CMAS notification.
cn-Domain
Indicates the origin of paging.
eab-ParamModification
If present: indication of an EAB parameters (SIB14) modification.
etws-Indication
If present: indication of an ETWS primary notification and/ or ETWS secondary notification.
fmeas-Indication
If present: indication of an FM Emergency Alert System notification.
imsi
The International Mobile Subscriber Identity, a globally unique permanent subscriber identity, see TS 23.003 [27]. The first element contains the first IMSI digit, the second element contains the second IMSI digit and so on.
redistributionIndication
If present: indication to trigger E-UTRAN inter-frequency redistribution procedure as specified in TS 36.304 [4, 5.2.4.10]
systemInfoModification
If present: indication of a BCCH modification other than SIB10, SIB11, SIB12 and SIB14. This indication does not apply to UEs using eDRX cycle longer than the BCCH modification period.
systemInfoModification-eDRX
If present: indication of a BCCH modification other than SIB10, SIB11, SIB12 and SIB14. This indication applies only to UEs using eDRX cycle longer than the BCCH modification period.
ue-Identity
Provides the NAS identity of the UE that is being paged.

Similarly, 3GPP TS 36.331 may be modified in accordance the bold portions of Table 5 below.

TABLE 5

3GPP TS 36.331 with new fmeas-Indication 3GPP TS36.331

5.3.2 Paging
5.3.2.1    General
            FIG. 5.3.2.1-1: Paging
The purpose of this procedure is:
- to inform UEs in RRC_IDLE other than NB-IoT UEs, and UEs in RRC_CONNECTED other than NB-IoT UEs, BL UEs and UEs in CE, about an FM Emergency Alert System (FMEAS) Notification and/ or;
The paging information is provided to upper layers, which in response may initiate RRC connection establishment, e.g. to receive an incoming call.
5.3.2.2    Initiation
E-UTRAN initiates the paging procedure by transmitting the Paging message at the UE's paging occasion as specified in TS 36.304 [4]. E-UTRAN may address multiple UEs within a Paging message by including one PagingRecord for each UE. E-UTRAN may also indicate a change of system information, and/ or provide an ETWS notification, a CMAS notification or an FM Emergency Alert System (FMEAS) notification in the Paging message.
5.3.2.3    Reception of the Paging message by the UE
Upon receiving the Paging message, the UE shall:
[...]
  1>if the etws-Indication is included and the UE is ETWS capable:
    2>re-acquire SystemInformationBlockType1 immediately, i.e., without waiting until the next system information modification period boundary;
    2>if the schedulingInfoList indicates that SystemInformationBlockType10 is present:

TABLE 5-continued

3GPP TS 36.331 with new fmeas-Indication 3GPP TS36.331

3>acquire SystemInformationBlockType10,
NOTE: If the UE is in CE, it is up to UE implementation when to start acquiring SystemInformationBlockType10.
    2>if the schedulingInfoList indicates that SystemInformationBlockType11 is present:
      3>acquire SystemInformationBlockType11,
  1>if the cmas-Indication is included and the UE is CMAS capable:
    2>re-acquire SystemInformationBlockType1 immediately, i.e., without waiting until the next system information modification period boundary as specified in 5.2.1.5;
    2>if the schedulingInfoList indicates that SystemInformationBlockType12 is present:
      3>acquire SystemInformationBlockType12,
  1>if the fmeas-Indication is included and the UE is FMEAS capable
    forward the indication to the upper layers;

As seen in bold in Table 5 above, an fmeas-Indication is provided for paging messages.

In a further alternative embodiment, rather than using a new indication within an existing message, a new emergency alert message may be created. In particular, a device or a UE, on receiving an emergency or PWS alert indication via a first technology may then receive an associated emergency PWS notification message. For example, the notification message may be received in accordance with the system acquisition procedure as defined in the embodiment above. The notification may contain a predefined or specially encoded message containing information related to the activation and use of the second technology.

On reception of such notification message, following the reception of an emergency or PWS alert indication, the information contained within the notification message relating to the operation and control of the second technology is forwarded to the device or UE's higher layers. The device higher layer responsible for decoding the information may then extract the details regarding the activation and control of the second technology, including data information such as RDS fields required, along with any other additional information regarding such operation.

The UE's upper layers may then send this information to the controller for the second technology. For example, such controller may be an FM radio controller. The sending may be done in order that the controller may activate the second radio technology receiver if required and control the selection of available signals or programs. For example, the controller, on receiving the information extracted from the notification message and subsequent to the reception of an emergency or PWS or EAS indication may operate the second technology so that it receives related emergency, PWS or EAS information via the second technology.

The FM controller may be a stand-alone component which interfaces with the cellular or WLAN controller or the cellular or WLAN upper layers. Alternatively, the FM controller may be an integrated component or device within the device or within the cellular controller.

In a fourth embodiment, existing system information blocks may be used for activation of the second technology. In particular, a device or UE supporting an FM receiver capable of receiving an Emergency Alert System or other identified emergency related information may then acquire the respective notification or system information block type messages after receiving the emergency/PWS/EAS alert indication. Such EAS alert indication may for example be an etws-Indication or cmas-Indication.

If the device receives a new alert indication such as the fm-Indication or fmeas-Indication described above, it may receive an already defined notification message as associated with the CMAS or ETWS. For example, this notification may be a CMAS notification message within the SystemInformationBlockType11. However, the content of the notification message or segment of notification message may include a newly encoded message, wherein the new encoding information relates to the activation and operation of the second technology such as the FM receiver with RDS.

Second technology information may be included and transmitted by the first technology within an existing CB Data Information Element, as included within the ETWS or CMAS notification messages. In this case, the inclusion of the information within the transmitted notification message may be in a manner where the reception of the information will be backwards compatible. In other words, devices that currently receive CB Data Information Elements or devices that do not support FM receivers may continue to receive the CB Data Information Element and handle the remaining or existing data that does not relate to the activation or operation of the second technology. Thus, devices that are not second technology capable simply ignore the information related to the second technology.

Where the information is encoded using an existing format, such as that used with encoding CB Data IEs, the extra data or information relating to the activation and/or operation of this second technology may be used. For example, the CB Data Information Element could be enhanced to support additional information related to the activation and operation of the FM receiver within the existing CB Data IE or as a new or separate CB Data IE specifically for the purpose of controlling and activating an FM receiver.

Following the reception, the enhanced notification message may be forwarded to the device or UE higher layers from the EUTRA access stratum such as the RRC layer. This device higher layer responsible for decoding the CB Data Information Element on reception of the forwarded information element will extract the details regarding the activation and operation of the associated FM receiver and store it.

The upper layers of a device may then send this information to the second technology controller such as an FM radio controller, which may then store the information for future use. The controller may activate the second technology receiver if it is not already active and control the selection of the available signals or programs. For example, the controller, on receiving information following reception of an emergency/PWS or EAS indication, may operate the second technology so that it receives related emergency/PWS or EAS information via the second technology.

In a fifth embodiment, the second technology may be activated and controlled via a new message. Thus, an alternative to receiving the second technology activation and control within an existing message or information element could be that the device or UE uses a first technology receiver to receive a new message or information element to receive a new notification message containing the second technology information.

For example, a device or UE capable of receiving a second technology, such as an FM signal, receives information related to the activation and operation of the second technology receiver through the first technology. Thus, a device or UE connected to a first technology such as 3GPP cellular technology may receive an emergency alert indication, whether an existing alert indication or a new alert indication such as a cmas-Indication or femas-Indication. Following reception of the alert indication, the device may then receive or acquire a new broadcast notification message or information element containing information related to the activation and/or operation of the second technology such as the FM radio broadcast. Second technology information may contain details such as frequency and/or additional data possibly related to the FM RDS encoded information. The second technology information may in particular follow the reception of the emergency alert on the first technology and relates to the reception of emergency or public safety related information via the second technology.

A device or UE supporting an FM receiver capable of receiving an emergency alert system or other identified emergency related information, following reception of an emergency/PWS/EAS alert indication, will then acquire a new notification or system information block type message. The EAS alert indication may, for example, be an etws-Indication or cmas-Indication.

Alternatively, the device may receive a new alert indication such as an fm-Indication or fmeas-Indication, whereupon it may receive a new notification or system information block type message.

For example, using the LTE/EUTRA cellular network, the system may transmit a new system information block type containing details related to the operation and control of an associated FM receiver. Specifically, following the reception of the emergency alert indication on the cellular network, the device or UE receives or acquires the system information related to the FM receiver for the purpose of activating and tuning the FM receiver in order to receive emergency or specifically identified public information via the FM receiver.

The FM receiver controller may control the FM receiver tuning by looking for a specific RDS encoded message within the FM broadcast such as program type code PTY #31. Alternatively, tuning control mechanisms may be used by tuning to an identified frequency or station identifier, including sweeping step by step across the VHF frequency band repeatedly until the intended station or RDS code is detected.

Table 6 below illustrates one option for a reception of an emergency PWS/EAS alert and a new system information block type containing information related to an associated FM receiver equipped with RDS.

TABLE 6

Example 3GPP TS36.331 RRC specification amendments
3GPP TS36.331

5.3.2 Paging
5.3.2.1    General
                        FIG. 5.3.2.1-1: Paging
The purpose of this procedure is:
  - to inform UEs in RRC_IDLE other than NB-IoT UEs, and UEs in RRC_CONNECTED other than NB-IoT UEs, BL UEs and UEs in CE, about an FM Emergency Alert System (FMEAS) Notification and/ or;
The paging information is provided to upper layers, which in response may initiate RRC connection establishment, e.g. to receive an incoming call.
5.3.2.2    Initiation
E-UTRAN initiates the paging procedure by transmitting the Paging message at the UE's paging occasion as specified in TS 36.304 [4]. E-UTRAN may address multiple UEs within a Paging message by including one PagingRecord for each UE. E-UTRAN may also indicate a change of system information, and/ or provide an ETWS notification, a CMAS notification or an FM Emergency Alert System (FMEAS) notification in the Paging message.
5.3.2.3    Reception of the Paging message by the UE
Upon receiving the Paging message, the UE shall:
[...]
    1>if the etws-Indication is included and the UE is ETWS capable:
        2>re-acquire SystemInformationBlockType1 immediately, i.e., without waiting until the next system information modification period boundary;
        2>if the schedulingInfoList indicates that SystemInformationBlockType10 is present:
            3>acquire SystemInformationBlockType10, TABLE 6-continued Example 3GPP TS36.331 RRC specification amendments
3GPP TS36.331

NOTE: If the UE is in CE, it is up to UE implementation when to start acquiring SystemInformationBlockType10.
        2>if the schedulingInfoList indicates that SystemInformationBlockType11 is present:
            3>acquire SystemInformationBlockType11;
    1>if the cmas-Indication is included and the UE is CMAS capable:
        2>re-acquire SystemInformationBlockType1 immediately, i.e., without waiting until the next system information modification period boundary as specified in 5.2.1.5;
        2>if the schedulingInfoList indicates that SystemInformationBlockType12 is present:
            3>acquire SystemInformationBlockType12,
    1>if the fmeas-Indication is included and the UE is FMEAS capable:
        2>re-acquire SystemInformationBlockTypeXX immediately, i.e., without waiting until the next system information modification period boundary as specified in 5.2.1.5;
        2>if the schedulingInfoList indicates that SystemInformationBlockTypeXX is present:
            3>acquire SystemInformationBlockTypeXX;

New information within a paging message is provided in bold in Table 6 above.

While Table 6 shows the reception of the new system information block type following the new fmeas-Indication message, it is also possible for a standard to specify that a device or UE supporting an FM receiver or any second technology receiver could also read any message or system information following reception of an existing alert or indication.

Table 7 below shows how a new message containing a second technology information may be encoded. The example of Table 7 utilizes an FM receiver as the second technology associated with the cellular receiver. In particular, the message may identify an FM frequency or a station identity or a program type or other specific code or parameter relating to a location or area that will enable an FM receiver to tune to and maintain reception of emergency broadcasts by the second technology. Specific source and/or digital signatures may be applied to this information to further improve the confidence of the first technology receiver to trust the sender of this information or to provide information intended for specific users in such a way that users receiving this information may have a trusted or confirmed or secure relationship with the originator of the information.

TABLE 7

Example of New System Information Block carrying FM Station Information

3GPP TS36.331
6.3                                      RRC information elements
6.3.1                                    System information blocks
        -SystemInformationBlockTypeXX
The IE SystemInformationBlockTypeXX contains a FMEAS notification.
                                      SystemInformationBlockTypeXX information element
-- ASN1START
SystemInformationBlockTypeXX-rx ::=                          SEQUENCE {
    messageIdentifier-rx                BIT STRING (SIZE (16)),
    serialNumber-rx                          BIT STRING (SIZE (16)),
    fmStationList-rx                     ::= SEQUENCE   (SIZE(1..maxfmStations))   OF
fmStaionInfo-rx
}
fmStationInfo-rx                        ::= SEQUENCE{
    geoposition-rx                     OCTET STRING,
    fmFrequency-rx                     INTEGER (0..4000),
    fmStationID-rx                     OCTET STRING (SIZE (8)),
    fmRDSPTYcode-rx                INTEGER (0..32),

TABLE 7-continued

Example of New System Information Block carrying FM Station Information

```
    DigitalSig-rx                    OCTECT STRING (SIZE (43)),
    SourceIdentifier-rx              OCTET STRING (SIZE (2)),
}
-- ASN1STOP
```

SystemInformationBlockTypeXX field descriptions
Geoposition
Identifies the area location that the fmStationID is located within.
Geographical information such as position, area, zone location This may be
encoded in a similar way to the RRC message [4] LocationInfo (including
coordinates/ ellipsoid details / uncertainty parameters)
fmStationID
Identifies the FM broadcast station according to the encoded ID using the
RDS encoding scheme defined in [refENRDS – EUROPEAN STANDARD
EN50067] [27]. The identity is coded within 4 groups, each group consisting
2 octets.
fmFrequency
Identifies the VHF frequency that the FM Station is broadcast on. Integer to
represent frequency from 70MHz to 110MHz step size of 10KHz i.e.
40x100=4000 points for tuning (raster) – 4096 (12 bits). E.g. fmFrequency
=0 (zero) = 70MHz – different raster could be envisaged as could other FM
broadcast frequencies.
fmRDSPTYcode
Identifies the RDS PTY code the FM receiver should search for to confirm
specific program type e.g. PTY code #31 indicates emergency program
(note. RBDS is the equivalent system to RDS in North America and defines
this PTY#31 as the Alarm program).
DigitalSig
a digital signature signing some or all the received information e.g. the
Geographical, Frequency and Station information from a trusted source.
Could be similar to digital signature defined in [5] e.g. Digital Signature
(octet 8 - 50, bits 1-8): i.e. this field contains a 43 byte digital signature.
SourceIdentitfier
The identity of a trusted source, e.g. information source such as PSAP or
Regulator.
Alternatively, this could reflect the Message Identifier as captured and
defined in [5] which identifies the source and type of Cell Broadcast System
message.

Alternatively, while the above provides a list containing one FM station per geographic entry, instead the list may include encoded multiple FM stations within each defined geographic area. In other words, there may be multiple FM station identifiers per geographic position. The encoding may be done even though it may be unlikely that multiple stations will have exactly the same geographical coverage, in particular if not sharing the same frequency or same antenna for broadcasting. For example, the geographic mapping may be on a per station basis and each mapping may cover an area. The device may look up its precise location and see which areas encompass the location, and choose to tune to the mapped stations for each area. The location and area may use some allowance for variation and tolerance for measurement and location method inaccuracies, to ensure the likelihood of each specified area is reasonably likely.

Other encoding schemes are also possible, but typically would support broadcasting details for controlling the FM receiver associated with the cellular receiver over a cellular network for reception by the cellular receiver. In particular, the embodiments described herein allow for the specific reception of Emergency Alert System or other identified emergency related information as encoded or broadcast by the FM radio broadcast system.

The reception by the second technology such as the FM broadcast information may either be independent or in addition to the associated notification information provided following the initial emergency alert indication via the first technology, such as provided by the associated ETWS notification or CMAS notification messages. For example, reference is now made to Table 8 below.

TABLE 8

Example of text relating to the handling of received FM Station information as may be broadcast by a cellular system or network 3GPP TS36.331

5.2.2.19    Actions upon reception of SystemInformationBlockTypeXX
Upon receiving SystemInformationBlockTypeXX, the UE shall:
>store the received fmStationInfo for each entry in the fmStationList, any previously stored fmStationInfo shall be overwritten;
>when all entries of the fmStationList have been stored, forward the received FM Emergency Alert System broadcast indication notification along with FM Station Information contained in the fmStationInfo to upper layers;

In Table 8 above, an example is provided of standard text related to the handling of received FM station information that may be broadcast by a cellular system or network in order to provide an up-to-date FM station information following the sending of an FM emergency alert system notification.

Following reception of a new message or information element in the information related to the second technology, the information may then be stored and forwarded to the device or UE higher layers from the EUTRA access stratum such as the RRC layer. The device higher layer sends this information to the second technology controller such as the FM radio controller. The second technology controller may activate the second technology receiver if not already active, and control the selection of available signals or programs.

Receiving Transmissions from the Second Technology

As seen with messages 650 and 660 in FIG. 6, the FM receiver controller, on the reception of the emergency/PWS alert indication and/or related information forwarded from the radio access system access stratum or radio layer, will check to see the current state of the FM receiver. In other cases, the media player or media device will be checked for its current status.

In some instances, such as if the device is a handheld mobile device, the FM receiver may require some associated apparatus such as a headset to be plugged in for the receiver to tune into any FM frequency for reception. In this case, the headset cable may act as an antenna for the VHF signal and therefore improve the reception capability of the FM receiver to receive the FM broadcast. If the FM controller receives an indication to turn on or tune into a receiver and the headset or associated antenna necessary for tuning the receiver is not present, as indicated to the FM controller, then the FM controller may detect that the associated apparatus for tuning the receiver is not present and may not tune the FM receiver. The FM controller may additionally or alternatively send an indication which causes the device to signal, maybe using a visual cue, to a user to indicate that the associated apparatus is missing and that the user should attach it, as for example shown with optional message 670 in FIG. 6.

The other associated tuning apparatus may include a connection to an external FM antenna, such as a vehicle antenna in some cases.

Other behavior relating to continued reception of emergency or PWS warning messages via the first technology may also continue, in particular following notification from the second technology controller that it is unable to receive the emergency broadcasts for example due to a technical problem or difficulty finding a suitable FM station after scanning an entire VHF band possibly once or maybe more than once. For example, this may be due to the inability to tune in due to lack of antenna.

Device Capability Advertisements

The embodiment of FIG. 6 assumes that the UE is capable of controlling a media device 612, which is either built-in or external to the UE. However, this is not always the case. In this regard, prior to message 620, the UE 610 may provide a first technology server 614 with information with regard to its capabilities, as shown by message 680.

Specifically, a device or UE which is capable of supporting connectivity to an associated technology network for the purpose of receiving emergency alert indications and which supports an FM receiver, associated FM receiver, or Wi-Fi, may need to notify the associated technology of its ability to connect to and/or control the associated technology receiver. Such a capability may, for example, be considered to make the device an FM emergency alert system or WLAN capable device.

For example, a device operating on a 3GPP LTE or Fifth Generation New Radio (5G-NR) radio network may need to signal its capability to connect to and/or control the FM receiver or WLAN to the radio network.

Alternatively, a device supporting the capability to connect to and/or control the FM receiver or WLAN may simply be aware of the capability and use it to trigger internal device behaviors such as the ability to receive indications from one radio access technology such as UMTS, EUTRA or 5G-NR among others, relating to the activation and control of an FM receiver for the purpose of receiving emergency/PWS/EAS messages via the FM receiver or Wi-Fi.

An IEEE 802.11 capable device would then notify the IEEE 802.11 network by sending a new Wi-Fi-Emergency Alert System (WEAS) capable bit within a probe request or through the transmission of a new ANQP request as provided below. Such capability may, for example, allow the device to be considered WEAS capable.

Reference is now made to Table 9, which shows an example of how an RRC UE capability message may be amended to provide details of the UE capability to support and/or control an associated FM receiver for the purposes of receiving an FM Emergency Alert System or similarly identified emergency broadcast message or announcement.

TABLE 9

Example of an amendment to a RRC UE Capability message

```
3GPP TS36.331
-           UECapabilityInformation
The UECapabilityInformation message is used to transfer of UE radio access
capabilities requested by the E-UTRAN.
    Signalling radio bearer: SRB1
    RLC-SAP: AM
    Logical channel: DCCH
    Direction: UE to E-UTRAN
                    UECapabilityInformation message
-- ASN1START
UECapabilityInformation ::=                 SEQUENCE {
    rrc-TransactionIdentifier                   RRC-TransactionIdentifier,
    criticalExtensions                          CHOICE {
        c1                                          CHOICE{
            ueCapabilityInformation-r8                  UECapabilityInformation-r8-IEs,
            spare7 NULL,
            spare6 NULL, spare5 NULL, spare4 NULL,
            spare3 NULL, spare2 NULL, spare1 NULL
        },
        criticalExtensionsFuture                    SEQUENCE { }
    }
}
UECapabilityInformation-r8-IEs ::=           SEQUENCE {
    ue-CapabilityRAT-ContainerList               UE-CapabilityRAT-ContainerList,
    nonCriticalExtension                         UECapabilityInformation-v8a0-IEs
    OPTIONAL
}
UECapabilityInformation-v8a0-IEs ::= SEQUENCE {
    lateNonCriticalExtension                  OCTET STRING
    OPTIONAL,
```

TABLE 9-continued

Example of an amendment to a RRC UE Capability message

```
        nonCriticalExtension               UECapabilityInformation-v1250-IEs
            OPTIONAL
}
UECapabilityInformation-v1250-IEs ::= SEQUENCE {
        ue-RadioPagingInfo-r12             UE-RadioPagingInfo-r12
            OPTIONAL,
        nonCriticalExtension               SEQUENCE { }
            OPTIONAL
}
UECapabilityInformation-vxyz-IEs ::= SEQUENCE {
        fmeas-capable-rx                   fmeas-capable-rx
            OPTIONAL,
        nonCriticalExtension               SEQUENCE { }
            OPTIONAL
}
-- ASN1STOP
```

UECapabilityInformation field descriptions
ue-RadioPagingInfo
This field contains UE capability information used for paging.
fmeas-capable
This field contains UE capability indication regarding the UE's ability to connect and control an associated FM receiver which may be capable of receiving Emergency Alert System notifications or broadcasts.

The UE capability information may therefore be amended as shown in Table 9 above in bold.

On receiving the emergency/PWS/EAS alert indication, a device which is FMEAS capable has an associated FM receiver and may receive associated emergency/PWS/EAS notification messages via an appropriate access technology such as cellular EUTRA informing the UE about the FM reception of emergency/PWS/EAS system broadcast notices.

The reception of FM receiver information following the reception of the emergency/PWS/EAS alert indication via system information is performed in a similar manner to the reception of the ETWS or CMAS notification messages described in 3GPP TS 36.331. Specifically, following the reception of the appropriate etws-Indication or cmas-Indication, the UE receiving the new emergency/PWS/EAS alert indication receives the associated perspective system information block type containing the information necessary to control the associated FM receiver using the system information acquisition procedure.

The received FM receiver information may be stored by the cellular receiver whilst the information or an indication regarding the storage of information is passed to upper layers in order to initiate the operation and control of the FM receiver.

Cell Broadcast

Within technologies such as GERAN, triggers and indicators of a PWS FM radio transmission can be signaled to the UE using cell broadcasts or dedicated Short Message Service (SMS) messages.

For example, the specification in 3GPP TS 23.040, and in particular section 9.4.1.2, may be amended in accordance with Table 10 below.

TABLE 10

Example change to 3GPP TS 23.040 section 9.4.1.2

| Decimal | Hex | Meaning |
|---|---|---|
| 6400 | 1900 | EU-Info Message Identifier for the local language as defined in ETSI TS 102 900. |
| 6401 | 1901 | Used to direct a device supporting an FM transmitter to tune to that frequency |
| 6402-40959 | 1902-9FFF | Intended for standardization in future versions of this document. These values shall not be transmitted by networks that are compliant to this version of this document. If a Message Identifier from this range is in the "search list", the ME shall attempt to receive this CBS message. |

As seen in Table 10 above, the coding of information within a new message identifier could be explicitly enumerated.

Therefore, based on the above, any of the implementations within the present disclosure could be utilized to signal new information in a new message identifier.

Receiving Emergency Public Warnings On a First Technology, Triggering Reception of an Emergency Message From A WLAN Network In a further embodiment of the present disclosure, a message or trigger may be received on a first technology, causing reception of an emergency message from a Wi-Fi or other WLAN network. Thus, WLAN technology may be used as a secondary technology for delivery of the emergency message (PWS). The WLAN radio bearer is therefore an alternative to the FM radio described above. While WLAN is being used as the second technology, all the first technology trigger solutions described above can equally apply to the present embodiment.

In one embodiment the PWS message on the second technology may be directly broadcast by the WLAN AP and only received by the UE, following reception of the first technology trigger solution.

WLAN Public Action Frame Exchange

Figure 8:
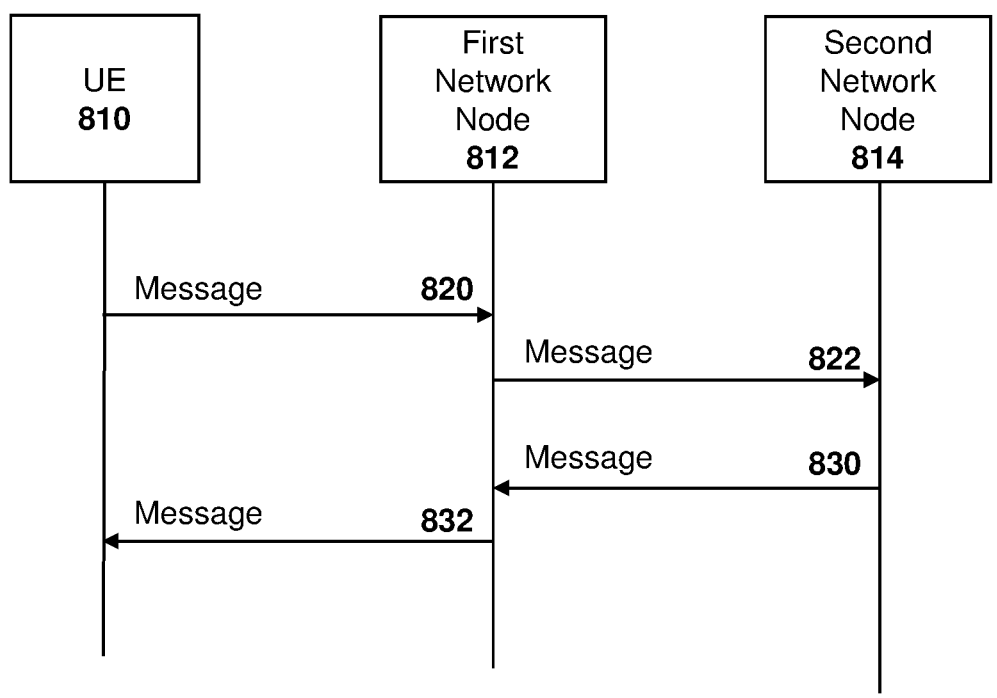
FIG. 8 is a dataflow diagram showing a wireless local area network public action frame exchange.

Reference is now made to FIG. 8, which shows a dataflow diagram between the various entities. In particular, a UE 810 may communicate with a first network node 812. Further, first network node 812 may communicate with a second network node 814.

A UE 810 may request the network to provide PWS information over WLAN. This could be done using public action frames, or over an existing protocol such as the ANQP. This can be done either before the device associates to the WLAN (pre-association), during or after association.

Therefore, in accordance with FIG. 8, a UE 810 sends a message 820 to the first network node 812. The first network node 812 receives message 820, which may contain additional UE provided information.

Upon receiving message 820, the first network node 812 may send message 822 to second network node 814. Message 822 may contain the additional UE provided information received in message 820.

Upon receiving message 822, the network node 814 may send message 830 to the first network node 812. Message 830 may contain one or both of a routing data and/or an error message.

Upon receiving message 830, first network node 812 sends message 832 to UE 810. Message 832 may contain one or both of routing data and/or an error message, depending on what was received at message 830.

In one embodiment, the functionality of the second network node 814 may be co-located with the first network node 812 in some embodiments, so that message 822 and message 830 become internal messages within first network node 812.

In one embodiment, the first network node 812 may be an access point for a WLAN network. Further, the second network node 814 may be an advertisement server for ANQP, and may also be referred to as an access network server.

Message 820 in the above, in one example, may be an ANQP Request.

Message 822 may, for example, be a CC-request.

Message 830 may be a CC-Answer.

Message 832 may, in some cases, be in a ANQP Response.

In some cases, the CC-Request and CC-Answer may be a DIAMETER or equivalent RADIUS message.

Messages could also be, in some cases, part of a different protocol.

In an alternative embodiment, various enhancements may, for example, be made to the IEEE 802.11-2016 or Wi-Fi Alliance Hotspot 2.0 specifications for encoding and providing information. Similar encoding to that shown in Table 11 below, can be used to enhance the Wi-Fi Alliance Hotspot 2.0 specification.

In the alternative embodiment, a new ANQP-element may be defined. The new ANQP-element encodes information in a binary form.

In particular, reference is made to Table 11 below, in which the bold text represents example changes to the IEEE 802.11-2016 specification. The tables identified within Table 11 correspond to the IEEE 802.11-2016 specification.

Table 9-271: ANQP-element definitions

| ANQP-element name | Info ID | ANQP-element (subclause) |
|---|---|---|
| Reserved | 0-255 | n/a |
| Public Warning System | 281 | 9.4.5.34 |
| Reserved | 282-56796 | n/a |

……..

Table 11-15: ANQP Usage

| ANQP-element Name | ANQP-Element (subclause) | ANQP-element type | AP | Mobile Device |
|---|---|---|---|---|
| Public Warning System | 9.4.5.34 | S | T | R |
| Symbols | | | | |
| Q     element is an ANQP Query | | | | |
| S     element is an ANQP Response | | | | |
| T     ANQP-element may be transmitted by MAC entity | | | | |
| R     ANQP-element may be received by MAC entity | | | | |

9.4.5.34. Public Warning System ANQP-element

The Public Warning System (PWS) ANQP-element provides information about PWS information available within the IEEE 802.11 AN. The PWS ANQP-element may include one of more of the following:

- PWS Binary, which is a binary form of the Public Warning System message

The format of the PWS ANQP-element is provided in Figure 4.X.1

| Info ID | Length | PWS Signature | PWS indicators |
|---------|--------|---------------|----------------|
| 2 | 2 | 8 | variable |

Octets:

Figure 4.X.1 – PWS ANQP-element format

The PWS Indicators field contains one or more variable length PWS Indicator fields.

The format of each PWS indicator field is provided in Figure 4.X.2.

TABLE 11: Example change to IEEE 802.11-2016 specification

Further, information may be provided in Table 12 below.

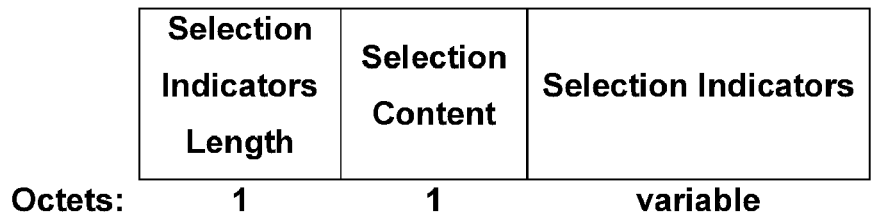
Figure 4.X.2 – PWS indicator field format
Selection Content Encoding Alternative A:
The Selection Content is a 1-octet subfield whose value indicates what additional information can be found in each Selection Indicators subfield:

| Meaning | value |
|---|---|
| PWS Binary | 0 |
| Receive PWS from FM radio | 1 |
| Receive PWS from LTE | 2 |
| Receive PWS from RDS radio | 3 |
| Receive PWS from TV whitespace | 4 |
| Reserved | 5-15 |

TABLE 12: Example change to IEEE 802.11-2016 specification

In an alternative embodiment, the WLAN AP may broadcast the PWS Binary information or the PWS message as described in Table 11 or Table 12. This PWS specific information may then be received by the UE either in an associated or unassociated state with the AP.

Receiving Emergency Public Warnings on a First Technology, Triggering Reception of an Emergency Message from an Infrastructure Network Using EAP In a further alternative embodiment, rather than FM or Wi-Fi, an extensible authentication protocol (EAP) technology may be used for delivering the emergency message. As with Wi-Fi, all first technology trigger solutions described above equally apply to the present embodiment.

Figure 9:
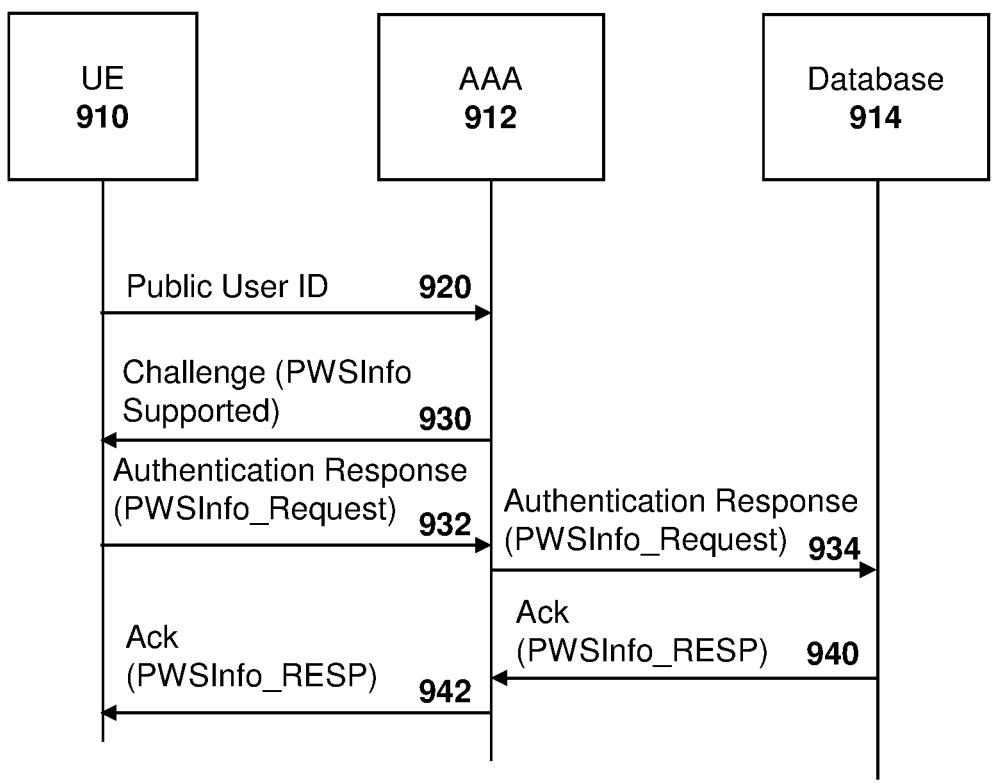
FIG. 9 is a dataflow diagram showing extensible authentication protocol signaling for short code configuration.

Reference is now made to FIG. 9, which shows an example dataflow diagram for EAP signaling for short code configuration. In particular, the embodiment of FIG. 9 includes a UE 910 communicating with AAA 912. Further, AAA 912 may communicate with a database 914.

In the embodiment of FIG. 9, the UE 910 sends a public user identifier message 920 to AAA 912.

Subsequently, modifications may be made to 3GPP TS 24.302 which accomplish Extensible Authentication Protocol for provision of emergency messages.

In particular, reference is made to Table 13. The text in bold in Table 13 provides a modification to the specification.

6.2.5 PWSInfo configuration

If the UE performs 3GPP-based access authentication, the 3GPP AAA server may send a list of emergency numbers from the non-3GPP access network to the UE during the EAP-AKA or EAP-AKA' based access authentication (i.e. EAP-AKA, EAP-AKA'). The indicator is sent using a AT_PWSInfo_RESP, by extending the EAP-AKA (and EAP-AKA') protocol as specified in subclause 8.2 of IETF RFC 4187 [33]. This attribute is provided in an EAP-Request/AKA-Challenge or EAP- Request/AKA'-Challenge message payload respectively. The detailed coding of this attribute is described in subclause 8.2.X.1.

6.XA PWSInfo configuration
6.XA.1 UE Procedures

4) If:
   a) the UE supports the "Configuration request";
   b) the EAP-Request/AKA'-Challenge message includes the AT_PWSInfo_REQUEST_SUPPORTED attribute as described in subclause 8.2.X.1 wherein the message field as described in subclause 8.1.4.1:
  1) contains the message type field indicating PWSInfo_REQUEST_SUPPORTED; and
  2) contains the type field including the PWSInfo Request Supported field item as described in subclause 8.2.X.1 indicating PWSInfo Supported; and
  c) the UE requests usage of the " PWSInfo ";
5-6)  then the UE:
  a) shall include the AT_PWSInfo_REQUEST attribute according to subclause 8.2.X.2 in the EAP-Response/AKA'-Challenge message. In the message field according to subclause 8.1.4.1 of the AT_PWSInfo_REQUEST attribute, the UE shall:
    1) set the message type field to PWSInfo_REQUEST; and
    2) contains the type field including the PWSInfo Request field item as described in subclause 8.2.X.2 indicating PWSInfo requested; and
7-8) Upon receiving the EAP-Request/AKA'-Notification message including the AT_PWSInfo_RESP attribute as described in subclause 8.2.X.3 where the message field as described in subclause 8.1.4.1:
  - contains the message type field indicating PWSInfo_RESP; and
  - contains the field PWSInfo Encoded;
the UE:
  - stores the PWSInfo received to be used to discover PWS information.
If this message is received in EAP-AKA' signalling, as used in tunnel set-up to an ePDG, the received PWSInfo shall be considered an alternative PWSInfo to use by the UE.

6.XA.2 AAA Procedures

The 3GPP AAA server may support PWSInfo configuration.

4) If the network supports PWSInfo configuration, the 3GPP AAA server shall include
  a) in the EAP-Request/AKA'-Challenge message, the AT_PWSInfo_REQUEST_SUPPORTED attribute as described in subclause 8.2.X.1, wherein the message field as described in subclause 8.1.4.1:

1) contains the message type field indicating PWSInfo_REQUEST_SUPPORTED; and 2) contains the type field including the PWSInfo Request Supported field item as described in subclause 8.2.X.1 indicating PWSInfo Supported; and 5-6) If the 3GPP AAA server supports PWSInfo configuration; and the AAA server receives the AT_PWSInfo_REQUEST attribute according to subclause 8.2.X.2 in the EAP-Response/AKA'-Challenge message and in the message field according to subclause 8.1.4.1 of the AT_PWSInfo_REQUEST attribute 1) the message type field is set to PWSInfo_REQUEST; and 2) contains the type field including the "PWSInfo_REQUEST_SUPPORTED" value (see Table 8.1.4.1-2) as described in subclause 8.2.X.2 indicating PWSInfo requested;

then the AAA server optionally contacts an external database e.g. HSS, PCRF to obtain the PWSInfo to be used and provides those PWSInfo in the EAP-RSP/AKA'-identity message.

7-8) The AAA sends the EAP-Request/AKA'-Notification message including the AT_ PWSInfo_RESP attribute as described in subclause 8.2.X.3 where the message field as described in subclause 8.1.4.1:

- contains the message type field indicating PWSInfo_RESP; and
- contains the field PWSInfo Encoded as described in subclause 8.2.x.3.2;

8      PDUs and parameters specific to the present document 8.1    3GPP specific coding information defined within present document 8.1.4    PDUs for TWAN connection modes 8.1.4.1 Message The message is coded according to table 8.1.4.1-2.

Table 8.1.4.1-2: Message type

| The value is coded as follows. |
|---|
| 7  6  5  4  3  2  1  0 |

| | | | | | | | | |
|---|---|---|---|---|---|---|---|---|
| 0 | 0 | 0 | 0 | 0 | 0 | 0 | 1 | CONNECTION_CAPABILITY |
| 0 | 0 | 0 | 0 | 0 | 0 | 1 | 0 | SCM_REQUEST |
| 0 | 0 | 0 | 0 | 0 | 0 | 1 | 1 | SCM_RESPONSE |
| 0 | 0 | 0 | 0 | 0 | 1 | 0 | 0 | MCM_REQUEST |
| 0 | 0 | 0 | 0 | 0 | 1 | 0 | 1 | MCM_RESPONSE |
| 0 | 0 | 0 | 0 | 0 | 1 | 1 | 1 | PWSInfo_REQUEST_SUPPORTED |
| 0 | 0 | 0 | 0 | 1 | 0 | 0 | 0 | PWSInfo_REQUEST |

8.2.X   Identity attributes

8.2.X.1 AT_PWSInfo_Request Supported attribute

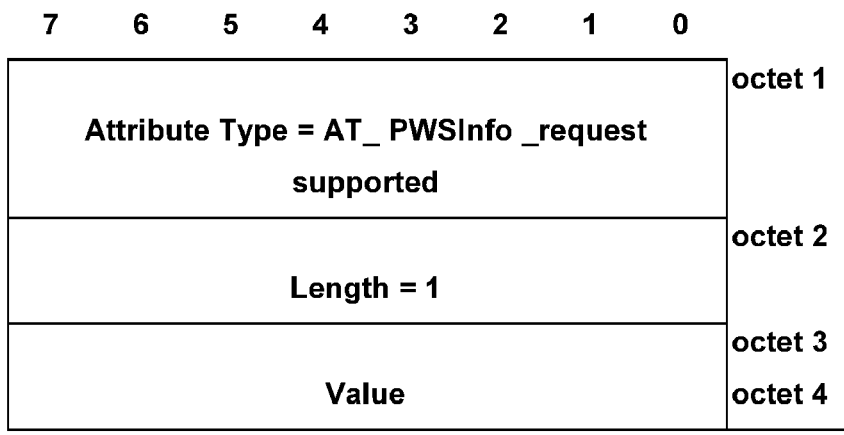

Figure 8.2.X.1-1: AT_PWSInfo_Request Supported attribute

Table 8.2.X.1-1: AT_PWSInfo_Request Supported

Octet 1 (in Figure 8.2.X.1-1) indicates the type of attribute as AT_PWSInfo_Request Supported.

Octet 2 (in Figure 8.2.X.1-1) is the length of this attribute which shall be set to 1 as per IETF RFC 4187 [33]

Octets 3 (in Figure 8.2.X.1-1) and 4 (in Figure 8.2.X.1-1) are the value of the attribute. Octet 3 (in Figure 8.2.X.1-1) is reserved and shall be coded as zero. Octet 4 (in Figure 8.2.X.1-1) shall be set as follows. All other values are reserved.

| 7 | 6 | 5 | 4 | 3 | 2 | 1 | 0 | PWSInfo Request Supported field |
|---|---|---|---|---|---|---|---|---|
| 0 | 0 | 0 | 0 | 0 | 0 | 0 | 1 | PWSInfo Request Supported |
| 0 | 0 | 0 | 0 | 0 | 0 | 1 | 0 | PWSInfo Request not supported |
| 1 | 1 | 1 | 1 | 1 | 1 | 1 | 1 | Reserved |

8.2.X.2 AT_PWSInfo_Request attribute

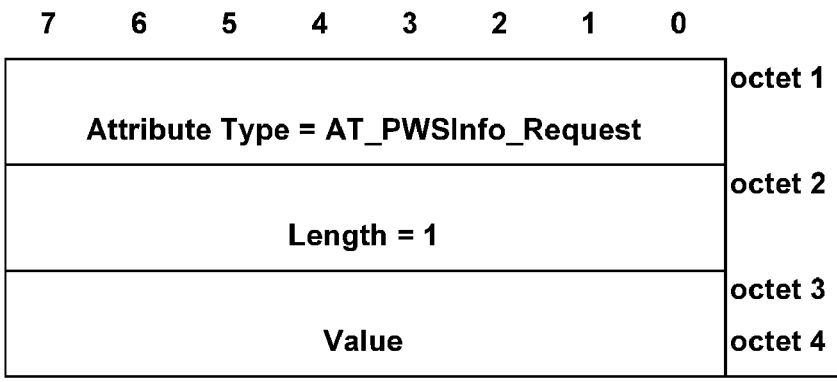

Figure 8.2.X.2-1: AT_PWSInfo_Request attribute

Table 8.2.X.2-1: AT_PWSInfo_Request attribute

Octet 1 (in Figure 8.2.X.2-1) indicates the type of attribute as AT_PWSInfo_Request with a value of 1XX.

Octet 2 (in Figure 8.2.X.2-1) is the length of this attribute which shall be set to 1 as per IETF RFC 4187 [33]

Octet 3 (in Figure 8.2.X.2-1) and 4 (in Figure 8.2.X.2-1) is the value of the attribute. Octet 3 (in Figure 8.2.X.2-1) is reserved and shall be coded as zero. Octet 4 (in Figure 8.2.X.2-1) shall be set as follows. All other values are reserved.

| 7 | 6 | 5 | 4 | 3 | 2 | 1 | 0 | PWSInfo requested field |
|---|---|---|---|---|---|---|---|---|
| 0 | 0 | 0 | 0 | 0 | 0 | 0 | 1 | PWSInfo requested |
| 0 | 0 | 0 | 0 | 0 | 0 | 1 | 0 | Reserved to |
| 1 | 1 | 1 | 1 | 1 | 1 | 1 | 1 | Reserved |

8.2.X.3 AT_PWSInfo_RESP attribute

8.2.X.3.1 General

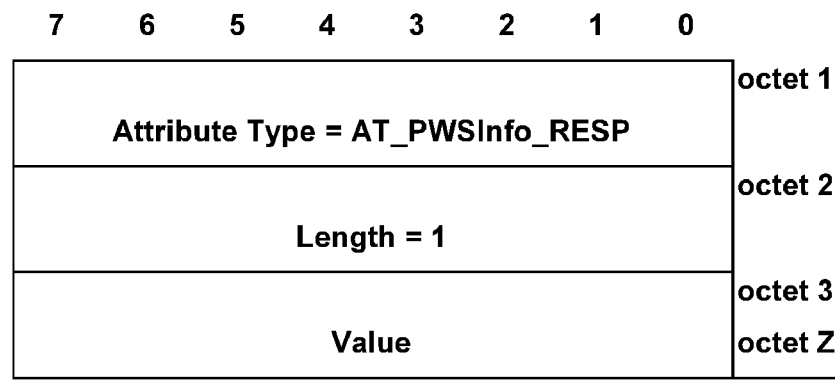

Figure 8.2.X.3-1: AT_PWSInfo_RESP attribute

8.2.x.3.2 PWSInfo encoded

There may be multiple PWSInfos encoded in the AT_PWSInfo_RESP_attribute.

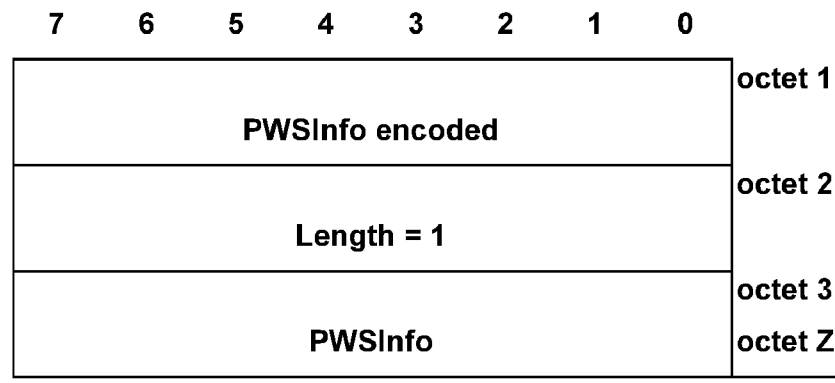

Figure 8.2.X.3-1: AT_PWSInfo RESP attribute Value

Table 8.2.X.3-1: AT_PWSInfo_RESP attribute Value

| Octet 1 (in Figure 8.2.X.3-1) indicates the identity that is encoded. |
|---|

| | | | | | | | | |
|---|---|---|---|---|---|---|---|---|
| Octet 1 (in Figure 8.2.X.3-1) shall be set as follows. All other values are reserved. | | | | | | | | |
| 7 | 6 | 5 | 4 | 3 | 2 | 1 | 0 | PWSInfo Encoded field |
| 0 | 0 | 0 | 0 | 0 | 0 | 0 | 1 | PWSInfo binary |
| 0 | 0 | 0 | 0 | 0 | 0 | 1 | 0 | Reserved |
| 0 | 0 | 0 | 0 | 0 | 0 | 1 | 1 | Reserved to |
| 1 | 1 | 1 | 1 | 1 | 1 | 1 | 1 | Reserved |
| 8.2.x.3.3 PWSInfo<br>The PWSInfo field is a binary information encoded as XXXXX. | | | | | | | | |
| NOTE to reader – XXXX means the encoding is per other solutions within the present disclosure | | | | | | | | |

TABLE 13: Example change to 3GPP TS 24.302

The correlation between FIG. 9 and Table 13 is outlined below.

In particular, AAA 912 sends a challenge message 930 including a PWS information request supported attribute. Message 930 corresponds with message number 4 in Table 13.

Based on the receipt of message 930, UE 910 sends an authentication response including the PWS info_request attribute. This is for example shown as message 932 in the embodiment of FIG. 9.

AAA 912 then sends an authentication response 934 to the database 914 which includes the PWS info_request attribute.

Messages 932 and 934 correspond with messages 5 to 6 in Table 13 above.

Database 914 may then send acknowledgement message in which a PWS info_response attribute is provided. This is shown with response 940. Response 940 corresponds with message 7 in Table 13.

On receipt of message 940, AAA 912 will then send the acknowledgement message with the PWS info response back to UE 910, shown by message 942. Message 942 corresponds with message number 8 in Table 13.

In the embodiments above, the secondary technology may be integrated with the first technology in the UE in some cases. In other cases, the two technologies may be distinct and a communication from a UE to a second media player for the second technology may exist. Each is described below.

When an application which may provide control of an associated FM receiver, possibly via an FM receiver controller, is supported on a mobile device or a modem embedded in for example an automobile, an option may be presented to the user to select the FM receiver to scan for an emergency alert as indicated via a received FM signal. This may be scheduled as a background task. In other words, the scheduling may occur regardless of whether the receiver is receiving an FM broadcast.

In particular, the FM receiver output may not be actively demodulated or the audio may be muted, possibly due to an ongoing activity related to the cellular or WLAN signal reception on the device. Nonetheless, the FM signal may still be analyzed.

For example, an option may be presented following notification from a cellular or WLAN device higher layer regarding reception of an emergency alert, and forwarding that alert to the FM controller or application. Alternatively, the decision to start to scan for emergency alerts may be autonomous on reception of a cellular or WLAN device higher layer indication of reception of an emergency alert.

In a further alternative, an option may be selected by the user of the FM controller application via the user interface independent of a cellular or WLAN upper layer indication and cause the FM receiver to scan for a specific data field embedded within the FM signal. For example, this may be via searching or scanning for a specific PTY code via the RDS/RBDS.

A scan by an FM receiver may look within the RDS message to check whether the program-type code PTY #31 is being broadcast. On determining that the FM station is broadcasting an emergency or PWS broadcast such as by detecting the PTY code, the FM receiver controller may send an alert to the application or cellular device higher layer. Such alert may, in turn, trigger a notification to the cellular device screen or other visible indicator such as an LED, indicating reception of an FM PWS emergency broadcast.

A user may then be presented with, or may select, an option via a screen message to switch on the FM receiver in order to channel or forward the received demodulated emergency alert message or audio. At this point, a device may then forward the demodulated information from the FM receiver to the associated audio circuit and this may interrupt or be prioritized over other ongoing audio services on the device.

The associated audio may be a connected audio system such as via a local Bluetooth™ connection for a car audio system or speakers if the device is connected to the vehicle via Bluetooth.

Alternatively, on detection of the emergency broadcast, instead of the user being presented with an option to switch and listen to the FM broadcast, a device may automatically switch to the associated audio system so that the demodulated broadcast can be received and heard by the user. This may be in response to the FM broadcast signal being identified as an emergency broadcast signal such as through a detection of PTY code #31.

In some cases, a visual indicator may automatically also be displayed on the device or any display associated with the device or media system to indicate reception of the broadcast PWS data. For example, one option would be to display on the car dashboard or instrument camera that the emergency broadcast message is occurring. Other examples are however possible such as warning or indicator light.

If the second technology is not integrated in the UE, it may be reached through a short range wired or wireless communication. Thus, when the FM receiver or tuner is part of an associated system that the cellular device is connected to, such as via local wireless protocol, the FM controller may reside in either the cellular device or the associated system or receiver module or in two parts one in each device or system component. For example, it may reside in the VHF/FM radio head unit.

If the FM controller is not located in the cellular device, a communications interface could exist between the cellular device and the associated system for the purposes of enabling the cellular/WLAN device to receive and forward instructions to the FM receiver controller.

Alternatively, if the FM controller is in a cellular or WLAN device but controls the FM receiver not located in cellular or WLAN device, an interface may exist between FM controller and the FM receiver located in the associated system. In particular, the interface could carry or transmit instructions for the control and reception of PWS information or messages as indicated by the public warning system, and the reception of these messages by the cellular device within the cellular system and the control of the associated FM receiver via the FM controller becomes possible.

In the above, the communication between the first entity and the second entity could be any wired or wireless communication. Examples of wireless communications between the two technology entities could, for example, include Bluetooth, WLAN, ZigBee, Near Field Communications (NFC) among others. In some cases, the communication may be via wireless connections such as Ethernet or Canbus. Other options are possible.

PWS Data Content And Format

The PWS information binary data could be formatted as described above.

Various examples identify only a signal location and frequency. However, the above could be modified to have multiple locations associated with a frequency and/or multiple frequencies associated with a location.

The payload of the PWS data could for example, include the contents identified in Table 14 below.

TABLE 14

Example payload of PWS data

| Name | Optional or mandatory | Use |
| --- | --- | --- |
| Location area | mandatory | Identifies the location that the Frequency is applicable to |
| Frequency(ies)/ Cell(s) | mandatory | Identifies the frequency(ies) that the $2^{nd}$ technology radio should be tuned to |
| $1^{st}$ time stamp | Optional | Identifies the time that the data was created |
| $2^{nd}$ time stamp | Optional | Identifies the time that the data will be updated |
| Decryption key/ Indicator | Optional | A key or pointer to a key that can be use by the receiving entity to decrypt the information |

As seen in Table 14 above, various data could be provided within the PWS message to assist in the control of the second technology for example including location, frequencies, timestamps, decryption keys, among other options.

Another example for data could be provided in a universal resource indicator. For example a universal resource indicator could be that shown in Table 15:

TABLE 15

Example URI to provide data a URI:
    e.g   radio://location:lat, long,
coverage_radius,band:fm,freq:107.1;time:<utc>,next_update:<utc>
where
<parameter>: <value> - value assignment
;- parameter separator In a further example, the PWS content could be in a JavaScript object notation (JSON) format as shown in Table 16 below. The JSON construct contains a technology (e.g. band), frequency to tune to in the technology, optional identity that might be associated with the frequency (e.g. in this example it is the radio station call sign), area the information is valid which is constructed using co-ordinates and a radius and a time the information is available for.

TABLE 15

Example JSON Token to provide data

```
a JSON token:
{
        "band": "fm"
            "frequency" :          "98.1"
        "radio ID" :               "kkiq"
        "long" :                   ""
        "lat" :                    ""
        "radius" :                 ""
        "time" :                   ""
}
```

Based on the above, as solutions allow users to receive the best aspects of both the multimedia emergency broadcast systems currently being implemented for television and radio stations, and also the text messages enabled for mobile devices. The solution allows for the enabling of modems and radios embedded in various devices such as mobile phones and automobiles to be triggered to receive information about a correct broadcast radio signal at the correct time.

The network elements and electronic devices described above may be any computing device. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Figure 10:
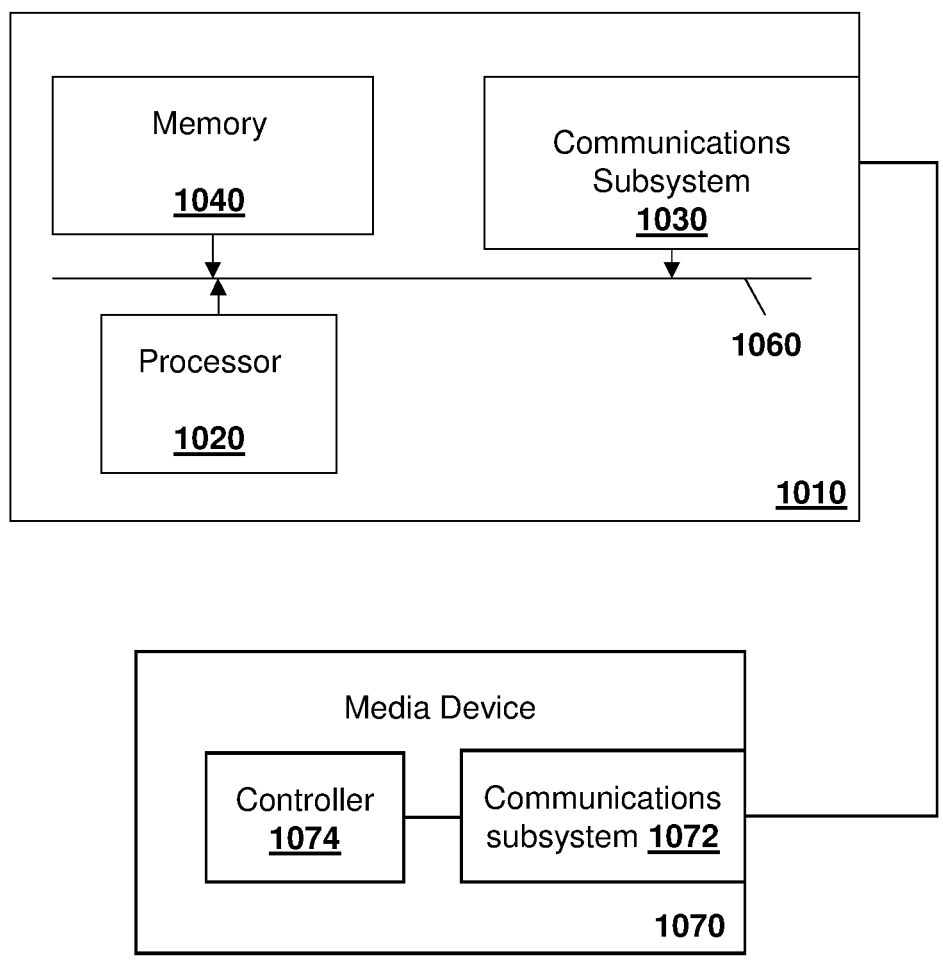
FIG. 10 is a block diagram of a simplified electronic device capable of being used with the methods and systems herein according to one embodiment.

One simplified block diagram of a computing device is shown with regard to FIG. 10.

In FIG. 10, device 1010 includes a processor 1020 and a communications subsystem 1030, where the processor 1020 and communications subsystem 1030 cooperate to perform the methods of the embodiments described above.

Processor 1020 is configured to execute programmable logic, which may be stored, along with data, on device 1010, and shown in the example of FIG. 10 as memory 1040. Memory 1040 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, solid state drive, or other memory known in the art.

Alternatively, or in addition to memory 1040, device 1010 may access data or programmable logic from an external storage medium, for example through communications subsystem 1030.

Communications subsystem 1030 allows device 1010 to communicate with other devices or network elements.

Communications between the various elements of device 1010 may be through an internal bus 1060 in one embodiment. However, other forms of communication are possible and are within the scope of the present disclosure.

In one embodiment, computing device 1010 may communicate with a media device 1070, for example through a communications subsystem 1072. For example, communications subsystem 1072 may allow a Bluetooth™ link between computing device 1010 and media device 1070.

In particular, computing device 1010 may control media device 1070 through a controller 1074. The controller 1074, for example, may be used to activate the media device or tune the media device to a particular frequency or station identifier. For example, if media device 1070 is the radio on a vehicle, controller 1074 may be used to activate the radio and to tune the radio to a particular frequency. The controller 1074 may then be considered to be a radio head for the media device. Other examples are possible.

Further, one example user equipment is described below with regard to FIG. 11.

User equipment 1100 may comprise a two-way wireless communication device having voice and data communication capabilities. User equipment 1100 generally has the capability to communicate with other computer systems on the Internet. Depending on the exact functionality provided, the user equipment may be referred to as a data messaging device, a two-way pager, a wireless e-mail device, a cellular telephone with data messaging capabilities, a wireless Internet appliance, a wireless device, a mobile device, a smartphone, a tablet, a laptop, a notebook, or a data communication device, as non-limiting examples.

Where user equipment 1100 is enabled for two-way communication, it may incorporate a communication subsystem 1111, including a receiver 1112 and a transmitter 1114, as well as associated components such as one or more antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate.

Network access requirements will also vary depending upon the type of network 1119. In some networks network access is associated with a subscriber or user of user equipment 1100. A user equipment may require a removable user identity module (RUIM) or a subscriber identity module (SIM) card in order to operate on a network. The SIM/RUIM interface 1144 is normally similar to a card-slot into which a SIM/RUIM card can be inserted and ejected. The SIM/RUIM card can have memory and hold many key configurations 1151, and other information 1153 such as identification, and subscriber related information. Without a SIM card, the user equipment may still be capable of limited functionality, including placing an emergency call.

When required network registration or activation procedures have been completed, user equipment 1100 may send and receive communication signals over the network 1119. As illustrated in FIG. 11, network 1119 can include multiple base stations communicating with the user equipment.

Signals received by antenna 1116 through communication network 1119 are input to receiver 1112, which may perform such common receiver functions as signal amplification, frequency down conversion, filtering, channel selection and the like. Analog to digital (A/D) conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog (D/A) conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

User equipment 1100 generally includes a processor 1138 which controls the overall operation of the device. Communication functions, including data and optionally voice communications, are performed through communication subsystem 1111. Processor 1138 also interacts with further device subsystems such as the display 1122, flash memory 1124, random access memory (RAM) 1126, auxiliary input/output (I/O) subsystems 1128, serial port 1130, one or more keyboards or keypads 1132, speaker 1134, microphone 1136, other communication subsystem 1140 such as a short-range communications subsystem and any other device subsystems, such as sensors, generally designated as 1142. Serial port 1130 may include a USB port or other port known to those in the art.

Figure 11:
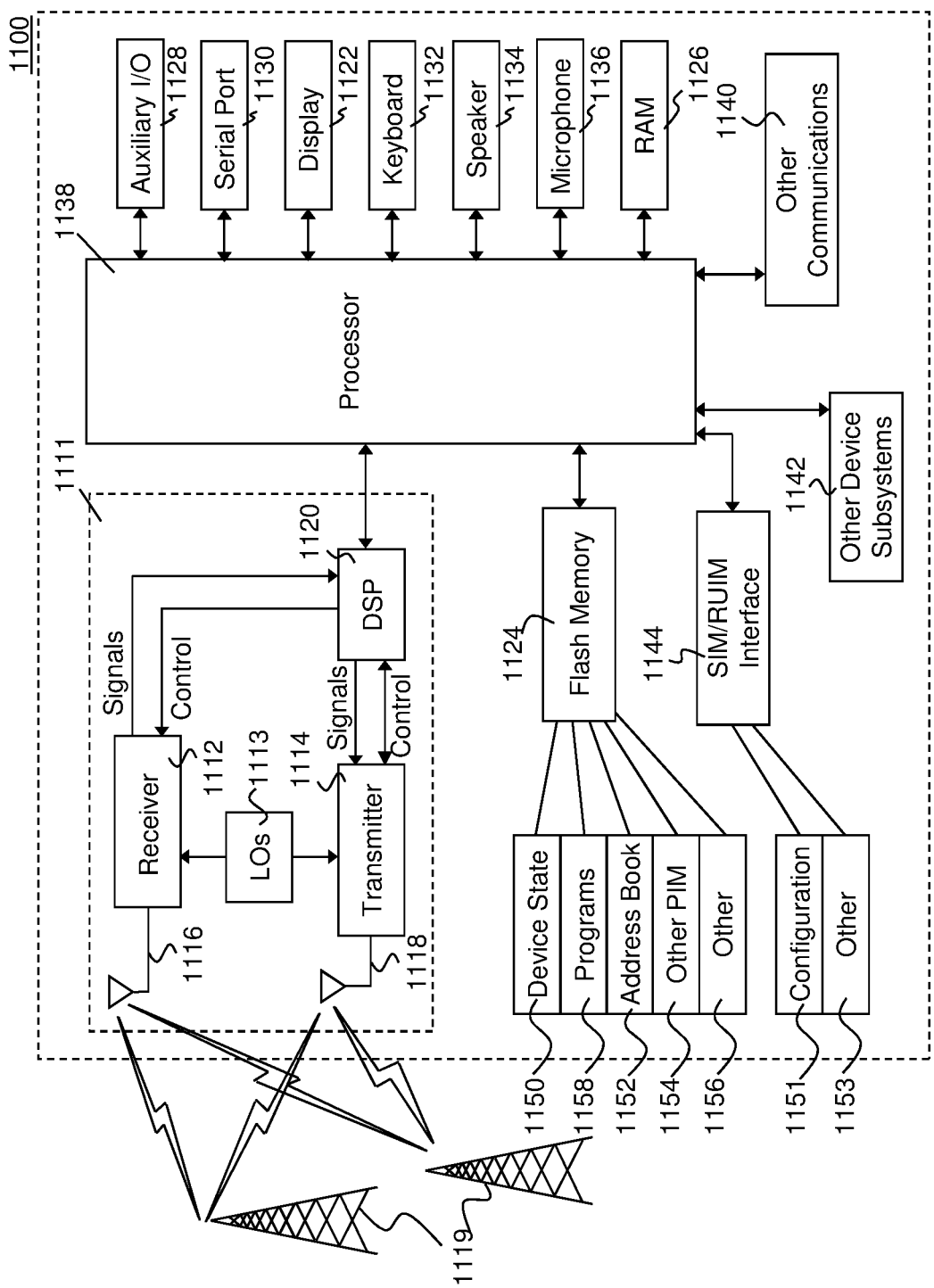
FIG. 11 is a block diagram of a user equipment according to one embodiment.

Some of the subsystems shown in FIG. 11 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the processor 1138 may be stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. On such program data storage may include a credential vault.

Processor 1138, in addition to its operating system functions, may enable execution of software applications on the user equipment. A predetermined set of applications that control basic operations, including at least data and voice communication applications for example, will normally be installed on user equipment 1100 during manufacturing. Other applications could be installed subsequently or dynamically.

Applications and software may be stored on any computer readable storage medium. The computer readable storage medium may be a tangible or intransitory/non-transitory medium such as optical (e.g., CD, DVD, etc.), magnetic (e.g., tape) or other memory known in the art.

One software application may be a personal information manager (PIM) application having the ability to organize and manage data items relating to the user of the user equipment such as, but not limited to, e-mail, calendar events, voice mails, appointments, and task items. Further applications, including productivity applications, social media applications, games, among others, may also be loaded onto the user equipment 1100 through the network 1119, an auxiliary I/O subsystem 1128, serial port 1130, short-range communications subsystem or any other suitable subsystem 1142, and installed by a user in the RAM 1126 or a non-volatile store (not shown) for execution by the processor 1138. Such flexibility in application installation increases the functionality of the device and may provide enhanced on-device functions, communication-related functions, or both.

In a data communication mode, a received signal such as a text message or web page download will be processed by the communication subsystem 1111 and input to the processor 1138, which may further process the received signal for output to the display 1122, or alternatively to an auxiliary I/O device 1128.

A user of user equipment 1100 may also compose data items such as email messages for example, using the keyboard 1132, which may be a complete alphanumeric keyboard or telephone-type keypad, either physical or virtual, among others, in conjunction with the display 1122 and possibly an auxiliary I/O device 1128. Such composed items may then be transmitted over a communication network through the communication subsystem 1111.

For voice communications which are optional, overall operation of user equipment 1100 is similar, except that received signals may typically be output to a speaker 1134 and signals for transmission may be generated by a microphone 1136. Alternative voice or audio I/O subsystems, such as a voice message recording subsystem, may also be implemented on user equipment 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 11 may be implemented in a user equipment for which synchronization with a user's desktop computer (not shown) may be desirable, but is an optional device component. Such a port 1130 may enable a user to set preferences through an external device or software application and may extend the capabilities of user equipment 1100 by providing for information or software downloads to user equipment 1100 other than through a wireless communication network. As will be appreciated by those skilled in the art, serial port 1130 can further be used to connect the user equipment to a computer to act as a modem or for charging a battery on the user equipment.

Other communications subsystems 1140, such as a short-range communications subsystem, is a further optional component which may provide for communication between user equipment 1100 and different systems or devices, which need not necessarily be similar devices. For example, the subsystem 1140 may include an infrared device and associated circuits and components or a Bluetooth™ communication module to provide for communication with similarly enabled systems and devices. Subsystem 1140 may further include non-cellular communications including WLAN communications such as WiFi or WiMAX, or near field communications. Subsystem 1140 may further include a frequency modulated radio and may provide for a controller to activate and tune such frequency modulated radio, and/or change a volume level for such frequency modulated radio.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a user equipment, the method comprising:
providing, in a registration message, a capability indication over a first technology indicating that the user equipment is capable of receiving data over at least one second technology of a plurality of second technologies, wherein the at least one second technology uses a frequency modulation receiver;
receiving at the user equipment over the first technology, an emergency notification, the emergency notification providing information for each of the plurality of second technologies capable of carrying an emergency message, wherein the information comprises, for a plurality of geographical locations, geographical information and at least one of frequency information, station or network identity information;

receiving a trigger over the first technology;

in response to receiving the trigger, selecting a second technology from the plurality of second technologies;

determining a current location of the user equipment; and activating the second technology using the current location of the user equipment and the information for the second technology to receive the emergency message.

2. The method of claim 1, wherein the activating comprises turning on the frequency modulation receiver if it is off and tuning the frequency modulation receiver to a frequency or station for receiving the emergency message.

3. The method of claim 1, wherein the emergency notification includes digital signature information, and wherein the user equipment, on receiving the emergency notification, is configured to verify the digital signature of the emergency notification.

4. The method of claim 1, wherein the second technology is integral to the user equipment, and wherein the activating comprising powering a circuit for the second technology.

5. The method of claim 4, further comprising, prior to the activating:
finding that preconditions for activating the second technology are not present; and
providing an alert through a user interface to satisfy the preconditions.

6. The method of claim 5, wherein the precondition is the plugging in of an antenna for the second technology.

7. The method of claim 1, wherein the second technology is external to the user equipment, and wherein the activating comprises sending commands to a control unit of the second technology.

8. The method of claim 1, wherein the activating comprises trying frequencies in an ordered list until the emergency message is successfully received.

9. A user equipment comprising:
a processor; and
a communications subsystem,
wherein the user equipment is configured to:
provide, in a registration message, a capability indication over a first technology indicating that the user equipment is capable of receiving data over at least one second technology of a plurality of second technologies, wherein the at least one second technology uses a frequency modulation receiver;
receive over the first technology, an emergency notification, the emergency notification providing information for each of the plurality of second technologies capable of carrying an emergency message, wherein the information comprises, for a plurality of geographical locations, geographical information and at least one of frequency information, station or network identity information;
receive a trigger over the first technology;
in response to receiving the trigger, select a second technology from the plurality of second technologies;
determine a current location of the user equipment; and
activate the second technology using the current location of the user equipment and the information for the second technology to receive the emergency message.

10. The user equipment of claim 9, wherein the user equipment is configured to activate by turning on the frequency modulation receiver if it is off and tuning the frequency modulation receiver to a frequency or station for receiving the emergency message.

11. The user equipment of claim 9, wherein the emergency notification includes digital signature information, and wherein the user equipment, on receiving the emergency notification, is configured to verify the digital signature of the emergency notification.

12. The user equipment of claim 9, wherein the second technology is integral to the user equipment, and wherein the user equipment is configured to activate by powering a circuit for the second technology.

13. The user equipment of claim 12, wherein the user equipment is further configured to, prior to the activating:
find that preconditions for activating the second technology are not present; and
provide an alert through a user interface to satisfy the preconditions.

14. The user equipment of claim 13, wherein the precondition is the plugging in of an antenna for the second technology.

15. The user equipment of claim 9, wherein the second technology is external to the user equipment, and wherein the user equipment is configured to activate by sending commands to a control unit of the second technology.

16. The user equipment of claim 9, wherein the user equipment is configured to activate by trying frequencies in an ordered list until the emergency message is successfully received.

17. A non-transitory computer readable medium for storing instruction code, which when executed by a processor of a user equipment cause the user equipment to:
provide, in a registration message, a capability indication over a first technology indicating that the user equipment is capable of receiving data over at least one second technology of a plurality of second technologies, wherein the at least one second technology uses a frequency modulation receiver;
receive over the first technology, an emergency notification, the emergency notification providing information for each of the plurality of second technologies capable of carrying an emergency message, wherein the information comprises, for a plurality of geographical locations, geographical information and at least one of frequency information, station or network identity information;
receive a trigger over the first technology;
in response to receiving the trigger, select a second technology from the plurality of second technologies;
determine a current location of the user equipment; and
activate the second technology using the current location of the user equipment and the information for the second technology to receive the emergency message.

* * * * *